US011835645B2

(12) United States Patent
Lin et al.

(10) Patent No.: US 11,835,645 B2
(45) Date of Patent: Dec. 5, 2023

(54) RECONFIGURABLE RF FRONT END AND ANTENNA ARRAYS FOR RADAR MODE SWITCHING

(71) Applicant: MediaTek Inc., Hsinchu (TW)

(72) Inventors: Tzu-Chin Lin, Hsinchu County (TW); Chih-Ming Hung, McKinney, TX (US)

(73) Assignee: MediaTek Inc.

( * ) Notice: Subject to any disclaimer, the term of this patent is extended or adjusted under 35 U.S.C. 154(b) by 522 days.

(21) Appl. No.: 15/620,854

(22) Filed: Jun. 13, 2017

(65) Prior Publication Data

US 2017/0276770 A1    Sep. 28, 2017

Related U.S. Application Data

(60) Provisional application No. 62/349,682, filed on Jun. 14, 2016.

(51) Int. Cl.
*G01S 7/40* (2006.01)
*G01S 13/931* (2020.01)
(Continued)

(52) U.S. Cl.
CPC .......... *G01S 7/4004* (2013.01); *G01S 13/931* (2013.01); *H01Q 3/24* (2013.01); *H01Q 21/06* (2013.01);
(Continued)

(58) Field of Classification Search
CPC ............... G01S 7/4004; H01Q 21/06
(Continued)

(56) References Cited

U.S. PATENT DOCUMENTS

| 6,043,790 A | 3/2000 | Derneryd et al. |
| 7,528,613 B1 * | 5/2009 | Thompson ............ G01S 13/953 |
| | | 324/637 |

(Continued)

FOREIGN PATENT DOCUMENTS

| CN | 101689697 A | 3/2010 |
| CN | 102680963 A | 9/2012 |

(Continued)

OTHER PUBLICATIONS

European Patent Office, Partial European Search Report for European Patent Application No. EP 17176118, dated Nov. 29, 2017.
(Continued)

*Primary Examiner* — Timothy A Brainard
*Assistant Examiner* — Helena H Seraydaryan
(74) *Attorney, Agent, or Firm* — Han IP PLLC; Andy M. Han

(57) ABSTRACT

Concepts and examples pertaining to reconfigurable radio frequency (RF) front end and antenna arrays for radar mode switching are described. A processor associated with a radar system selects a mode of a plurality of modes in which to operate the radar system. The processor then controls the radar system to operate in the selected mode by utilizing a plurality of antennas in a respective configuration of a plurality of configurations of the antennas which corresponds to the selected mode. Each configuration of the plurality of configurations of the antennas results in respective antenna characteristics. Each configuration of the plurality of configurations of the antennas utilizes a respective number of antennas of the plurality of antennas.

8 Claims, 16 Drawing Sheets

(51) Int. Cl.
*H01Q 3/24* (2006.01)
*H01Q 21/06* (2006.01)
*H01Q 25/00* (2006.01)
H01Q 1/32 (2006.01)
H01Q 21/00 (2006.01)
G01S 13/02 (2006.01)
G01S 7/02 (2006.01)

(52) U.S. Cl.
CPC ......... *H01Q 21/061* (2013.01); *H01Q 25/002* (2013.01); *G01S 7/027* (2021.05); *G01S 2013/0245* (2013.01); *G01S 2013/93271* (2020.01); *G01S 2013/93272* (2020.01); *H01Q 1/3233* (2013.01); *H01Q 21/0006* (2013.01); *H01Q 21/065* (2013.01)

(58) Field of Classification Search
USPC .......................................................... 342/174
See application file for complete search history.

(56) References Cited

U.S. PATENT DOCUMENTS

| 8,902,103 | B2 | 12/2014 | Kim et al. | |
|---|---|---|---|---|
| 2003/0146826 | A1 | 8/2003 | Viana et al. | |
| 2003/0164791 | A1 | 9/2003 | Shinoda et al. | |
| 2004/0214608 | A1* | 10/2004 | Mostafa | H04B 7/0608 |
| | | | | 455/562.1 |
| 2005/0128132 | A1 | 6/2005 | Ziller et al. | |
| 2008/0258964 | A1* | 10/2008 | Schoeberl | G01S 13/931 |
| | | | | 342/189 |
| 2015/0042507 | A1 | 2/2015 | Jeong et al. | |
| 2015/0070228 | A1 | 3/2015 | Gu et al. | |
| 2015/0159632 | A1* | 6/2015 | Vangen | F03D 1/0675 |
| | | | | 416/61 |
| 2016/0327639 | A1* | 11/2016 | Albert | G01S 7/4972 |

FOREIGN PATENT DOCUMENTS

| CN | 102893173 A | | 1/2013 | |
|---|---|---|---|---|
| CN | 104122556 A | | 10/2014 | |
| EP | 1522869 A1 | * | 4/2005 | ............ G01S 7/034 |
| EP | 1522869 A1 | | 4/2005 | |
| EP | 2423704 A1 | | 2/2012 | |
| JP | P2000-13245 A | | 1/2000 | |
| TW | 201425975 A | | 7/2014 | |
| WO | WO 03/052449 A2 | | 6/2003 | |
| WO | WO 03052449 A2 | | 6/2003 | |

OTHER PUBLICATIONS

European Patent Office, Extended European Search Report for European Patent Application No. EP 17176118.2, dated Feb. 26, 2018.

European Patent Office, Summons to Attend Oral Proceedings Pursuant to Rule 115(1) EPC regarding European Patent Application No. 17176118.2, Jan. 28, 2022.

China National Intellectual Property Administration, First Office Action for China Patent Application No. 201810588516.0, dated Aug. 2, 2022.

* cited by examiner

RECONFIGURABLE RF FRONT END AND ANTENNA ARRAYS FOR RADAR MODE SWITCHING

CROSS REFERENCE TO RELATED PATENT APPLICATIONS

The present disclosure claims the priority benefit of U.S. Provisional Patent Application Ser. No. 62/349,682, filed 14 Jun. 2016, which is incorporated by reference in its entirety.

TECHNICAL FIELD

The present disclosure is generally related to remote sensing and, more particularly, to a reconfigurable radio frequency (RF) front end and antenna arrays for radar mode switching.

BACKGROUND

Unless otherwise indicated herein, approaches described in this section are not prior art to the claims listed below and are not admitted to be prior art by inclusion in this section.

Automotive radars are a key component of Advanced Driver Assistance Systems (ADAS) and can be classified as ultra-short-range radars (USRR), short-range radars (SRR), medium-range radars (MRR) and long-range radars (LRR). Each class of radars requires a dedicated module design, as different classes of radars correspond to different antenna arrays with different gains, different field of views (FOV), beam patterns and the like. The form factor, such as size, of radar systems is usually dominated by antennas.

Thus, as the number of transmitter (TX) elements and receiver (RX) elements of a radar system increases, the associated cost and size would also increase. Moreover, switching between or among different antenna arrays for a given radar system is costly, at least in terms of size, power and performance. For example, additional and dedicated switches are needed with high loss at millimeter wave (mmWave) frequencies, e.g., a few dB loss per switch. Besides, there is also interconnect loss, and adjacent antenna spacing is constrained.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose various novel concepts and schemes pertaining to reconfigurable RF front end and antenna arrays for radar mode switching. Implementations in accordance with the present disclosure support multi-class radar in one module with less total antenna elements. Implementations in accordance with the present disclosure may utilize a radar chip with mode switch, and such radar chip has numerous advantages over designs with dedicated external switches. For example, a radar chip with mode switch in accordance with the present disclosure has less loss, consumes less power, has better performance, has a smaller size, and is associated with lower cost compared to designs with dedicated external switches.

In one aspect, a method may involve a processor associated with a radar system selecting a mode of a plurality of modes in which to operate the radar system. The method may also involve the processor controlling the radar system to operate in the selected mode by utilizing a plurality of antennas in a respective configuration of a plurality of configurations of the antennas which corresponds to the selected mode. Each configuration of the plurality of configurations of the antennas may result in respective antenna characteristics. Each configuration of the plurality of configurations of the antennas may utilize a respective number of antennas of the plurality of antennas.

In one aspect, a method may involve a processor associated with a radar system controlling the radar system to operate in a first mode of a plurality of modes by utilizing a plurality of antennas in a first configuration of a plurality of configurations of the antennas. The method may also involve the processor determining a need to switch the radar system from operating in the first mode to a second mode of the plurality of modes. The method may further involve the processor controlling the radar system to operate in the second mode by utilizing the plurality of antennas in a second configuration of the plurality of configurations of the antennas. Each configuration of the plurality of configurations of the antennas may result in respective antenna characteristics such that first antenna characteristics of the first configuration differ from second antenna characteristics of the second configuration.

In one aspect, an apparatus may include a plurality of antennas, one or more radar chips, and a processor. The plurality of antennas may be operable in one of a plurality of configurations for a respective one of a plurality of modes of radar operations. The plurality of antennas may include one or more in-package antennas and one or more external antennas. Each of the one or more radar chips may respectively include a transmitter and a receiver. Each of the one or more radar chips may be electrically coupled to a respective antenna of the plurality of antennas. The processor may be operatively coupled to the one or more radar chips to control the one or more radar chips to perform the radar operations. The processor may include a mode switching circuit and a control circuit. The mode switching circuit may select one of the plurality of modes of radar operations. The control circuit may control the one or more radar chips to operate in the selected mode by utilizing the plurality of antennas in a respective configuration of the plurality of configurations of the antennas which corresponds to the selected mode. Each configuration of the plurality of configurations of the antennas may result in respective antenna characteristics. Each configuration of the plurality of configurations of the antennas may utilize a respective number of antennas of the plurality of antennas. The one or more in-package antennas may be enclosed in a package with the one or more radar chips. The one or more external antennas may be external to the package.

It is noteworthy that, although description provided herein may be in the context of automotive radars and ADAS, the proposed concepts, schemes and any variation(s)/derivative (s) thereof may be implemented in other radar applications wherever suitable. Thus, the scope of the proposed schemes is not limited to the description provided herein.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
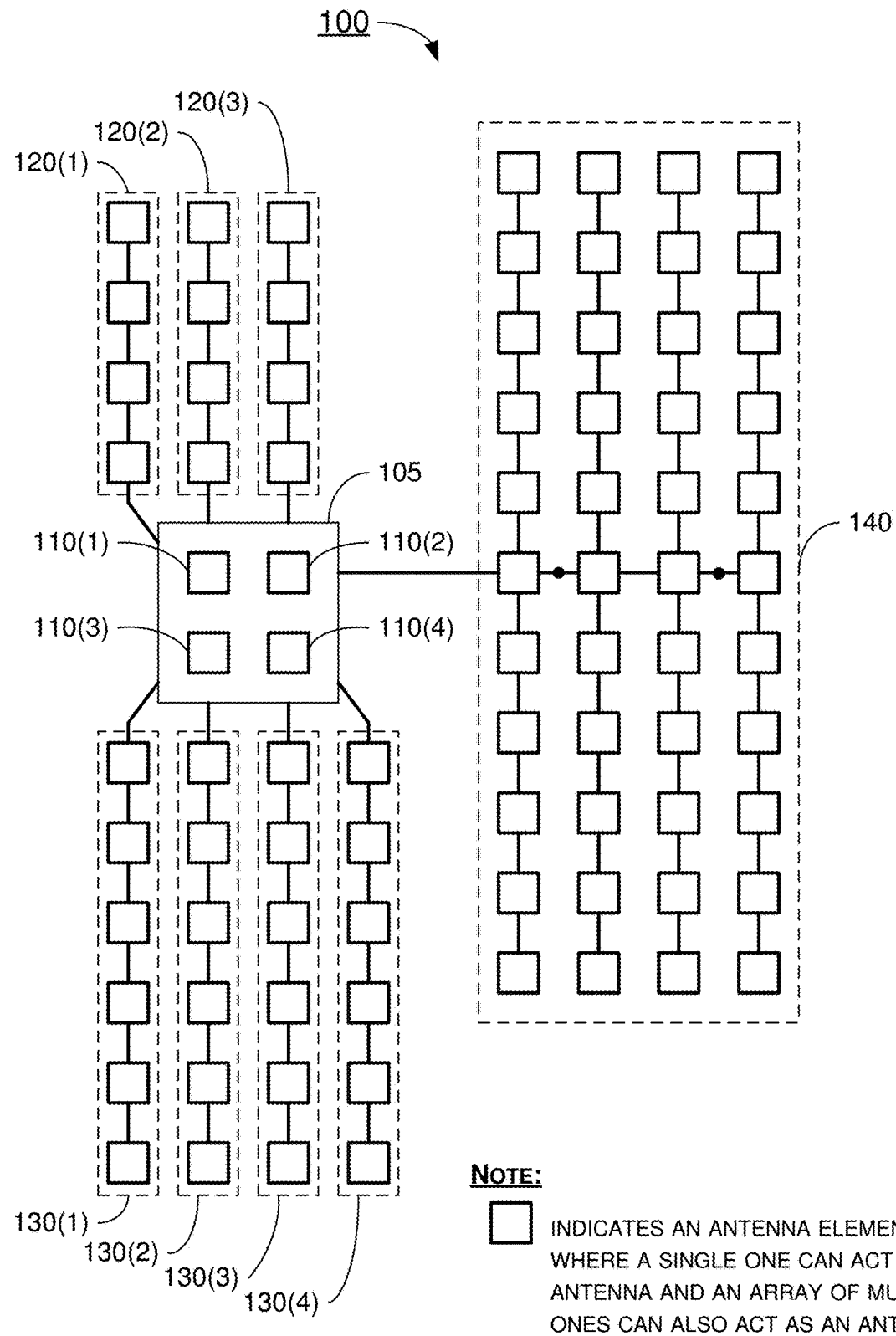
FIG. 1 is a diagram of an example radar system in accordance with an implementation of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Under a proposed scheme of the present disclosure, different classes of radar utilize different numbers of antenna elements or antennas of a multi-class radar. Accordingly, antenna elements may be planned and reused. The proposed scheme enables flexible configuration of a number of antennas, antenna elements and/or antenna arrays. That is, for a given number of antennas, antenna elements and/or antenna arrays in a multi-class radar system in accordance with the present disclosure, different configurations of the antennas, antenna elements and/or antenna arrays may correspond to different modes of radar operations. Moreover, different number of transmitters (and different number of antennas utilized for transmitting) may correspond to the different modes, and different number of receivers (and different number of antennas utilized for receiving) may correspond to the different modes.

To operate as a radar of the USRR class, a configuration of one TX and one RX, a configuration of one TX and two RX's, or a configuration of one TX and three RX's may be utilized. To operate as a radar of the SRR class and the MRR class, a configuration of one TX and three RX's or a configuration of two TX's and four RX's may be utilized. To operate as a radar of the LRR class, a configuration of one TX and four or more RX's may be utilized. That is, regardless of the class of radar, select antennas may be utilized as TX antenna(s) or RX antenna(s).

Under a proposed scheme, when all TX's and RX's are used, not all receiver antennas need to have the same characteristics. Under a proposed scheme, one or more antennas may be in-package antennas enclosed in a package with corresponding radar chip(s), and one or more antennas may be external antennas external to the package. The in-package antennas may be part of the antenna array of the radar system on a printed circuit board (PCB).

Under a proposed scheme, results of radar measurement over multiple frames/modes (time-interleaved) may be merged to provide a larger antenna array as well as multi-characteristic data to enhance signal and data processing. Moreover, implementations in accordance with the present disclosure may be able to have dedicated mmWave switch if needed.

Under a proposed scheme, when a TX path or a RX path is out of function, a different configuration of the antennas may be utilized to continue the radar operations in the same mode or as the same class of radar. Additionally, each TX antenna and RX antenna may be swapped out with another antenna to enable advanced signal processing.

FIG. 1 illustrates an example radar system 100 designed for reconfigurable RF front end and antenna arrays in accordance with an implementation of the present disclosure. In the example shown in FIG. 1, an individual antenna element may constitute an antenna. An array of multiple antenna elements may constitute an antenna. Moreover, multiple arrays of antenna elements may also constitute an antenna. Accordingly, such antennas may have different antenna characteristics such as gain, FOV, power consumption, performance and the like.

In the example shown in FIG. 1, there are twelve antennas, namely antennas 110(1), 110(2), 110(3), 110(4), 120(1), 120(2), 120(3), 130(1), 130(2), 130(3), 130(4) and 140. In this example, antennas 110(1)-110(4) are in-package antennas with very low gain and very large FOV. Antennas 120(1)-120(3) are external antennas disposed on a PCB with low gain and large FOV. Antennas 130(1)-130(4) are also external antennas disposed on the same or a different PCB as antennas 120(1)-120(3) with medium gain and medium FOV. Antenna 140 is another external antenna disposed on the same or a different PCB as antennas 120(1)-120(3) with high gain and small FOV. As can be seen, these twelve antennas have different sizes and are unsymmetrical.

Figure 2:
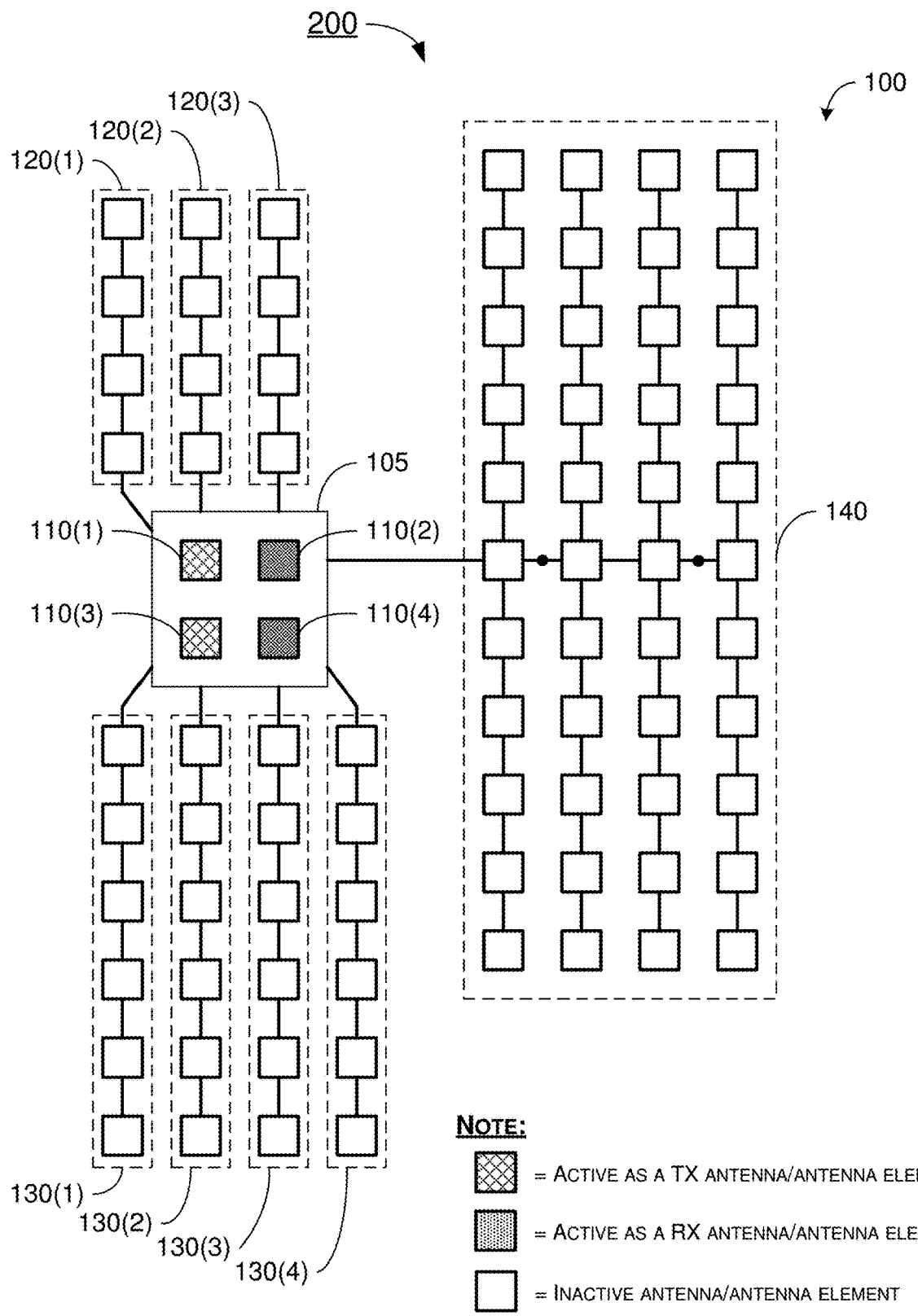
FIG. 2 is a diagram of an example configuration of the radar system of FIG. 1 in accordance with an implementation of the present disclosure.

FIG. 2 illustrates an example configuration 200 of radar system 100 in accordance with an implementation of the present disclosure. In the example shown in FIG. 2, antennas 110(1)-110(4), 120(1)-120(3), 130(1)-130(4) and 140 are utilized in a first configuration for radar system 100 to be in a first mode of radar operation as an USRR class of radar. For instance, two TX antennas and two RX antennas are utilized and active in this configuration. Specifically, as shown in FIG. 2, in-package antennas 110(1) and 110(3) are utilized as TX antennas that are electrically coupled to corresponding transmitters (not shown) to transmit radar signals. In this example, in-package antennas 110(2) and 110(4) are utilized as RX antennas that are electrically coupled to corresponding receivers (not shown) to receive reflected radar signals. In this configuration, the remaining antennas of radar system 100 are unused and stay inactive.

Figure 3:
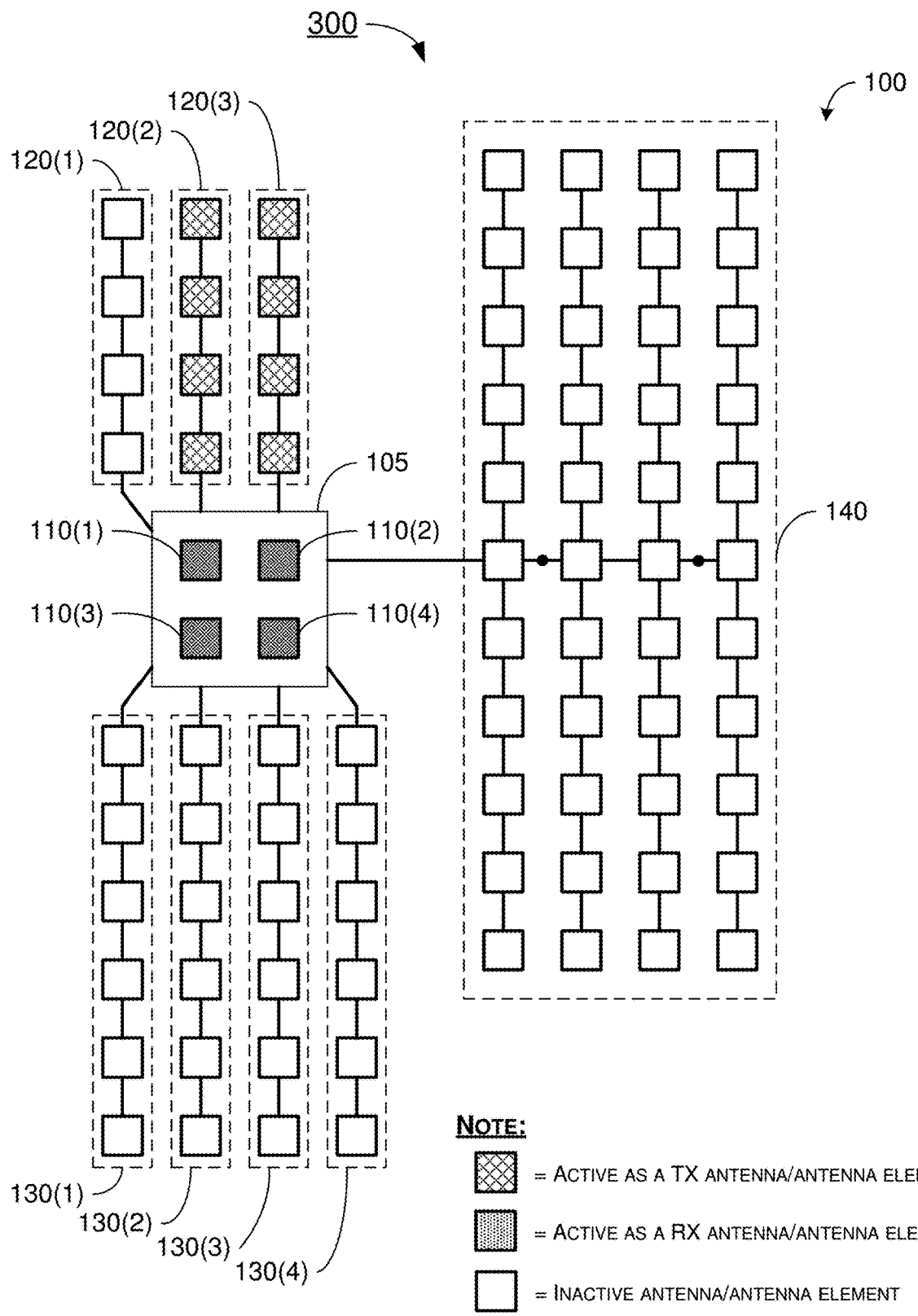
FIG. 3 is a diagram of another example configuration of the radar system of FIG. 1 in accordance with an implementation of the present disclosure.

FIG. 3 illustrates an example configuration 300 of radar system 100 in accordance with an implementation of the present disclosure. In the example shown in FIG. 3, antennas 110(1)-110(4), 120(1)-120(3), 130(1)-130(4) and 140 are utilized in a second configuration for radar system 100 to be in a second mode of radar operation as an SRR class of radar. For instance, two TX antennas and four RX antennas are utilized and active in this configuration. Specifically, as shown in FIG. 3, external antennas 120(2) and 120(3) are utilized as TX antennas that are electrically coupled to corresponding transmitters (not shown) to transmit radar signals. In this example, in-package antennas 110(1)-110(4) are utilized as RX antennas that are electrically coupled to corresponding receivers (not shown) to receive reflected radar signals. In this configuration, the remaining antennas of radar system 100 are unused and stay inactive. It is noteworthy that elements of the TX antenna array(s) need not be the same as the RX antenna array(s). For example, a RX antenna array may be formed by antennas 120(1)-120(4) plus antenna 130(3) simultaneously to "tune" the antenna characteristics (e.g, shapes of radiation pattern and FOV).

Figure 4:
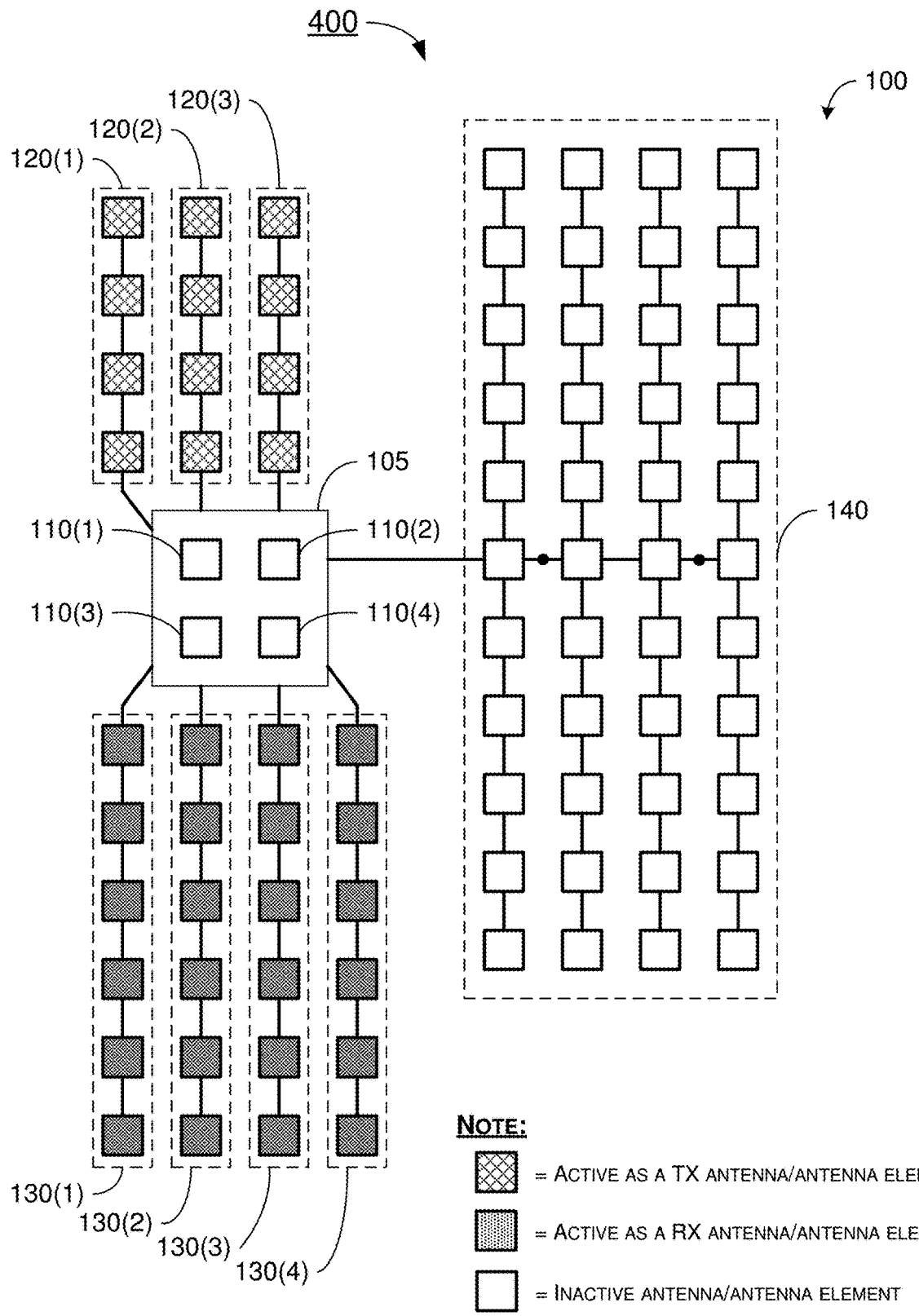
FIG. 4 is a diagram of another example configuration of the radar system of FIG. 1 in accordance with an implementation of the present disclosure.

FIG. 4 illustrates an example configuration 400 of radar system 100 in accordance with an implementation of the present disclosure. In the example shown in FIG. 4, antennas 110(1)-110(4), 120(1)-120(3), 130(1)-130(4) and 140 are utilized in a third configuration for radar system 100 to be in a third mode of radar operation as an MRR class of radar. For instance, three TX antennas and four RX antennas are utilized and active in this configuration. Specifically, as shown in FIG. 4, external antennas 120(1)-120(3) are utilized as TX antennas that are electrically coupled to corresponding transmitters (not shown) to transmit radar signals. In this example, external antennas 130(1)-130(4) are utilized as RX antennas that are electrically coupled to corresponding receivers (not shown) to receive reflected radar signals. In this configuration, the remaining antennas of radar system 100 are unused and stay inactive.

Figure 5:
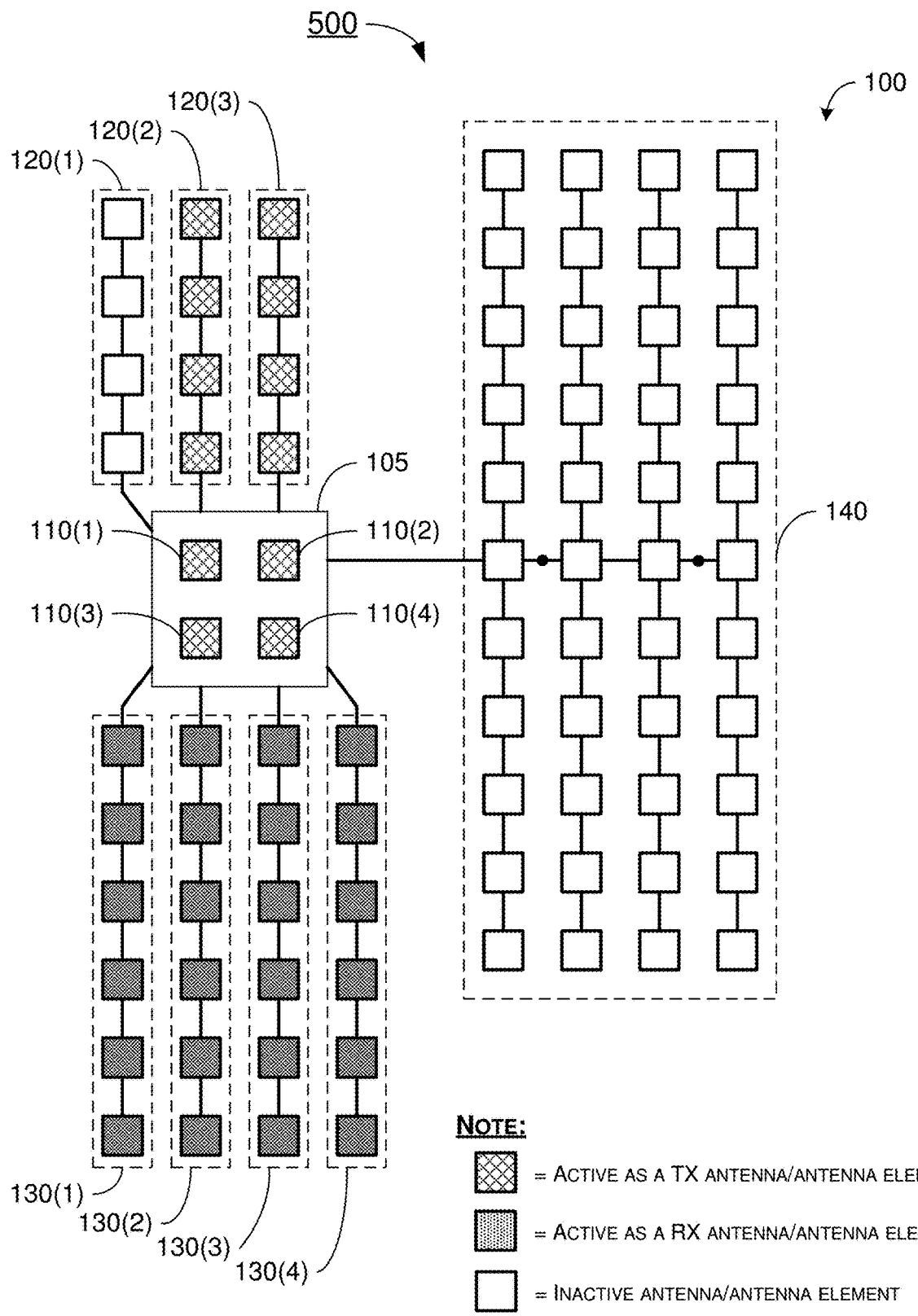
FIG. 5 is a diagram of another example configuration of the radar system of FIG. 1 in accordance with an implementation of the present disclosure.

FIG. 5 illustrates an example configuration 500 of radar system 100 in accordance with an implementation of the present disclosure. In the example shown in FIG. 5, antennas 110(1)-110(4), 120(1)-120(3), 130(1)-130(4) and 140 are utilized in a fourth configuration for radar system 100 to be in a fourth mode of radar operation as an MRR class of radar. For instance, two TX antennas and four RX antennas are utilized and active in this configuration. Specifically, as shown in FIG. 4, in-package antennas 110(1)-110(4) and external antennas 120(2) and 120(3) are utilized as TX antennas that are electrically coupled to corresponding transmitters (not shown) to transmit radar signals. In this example, external antennas 130(1)-130(4) are utilized as RX antennas that are electrically coupled to corresponding receivers (not shown) to receive reflected radar signals. In this configuration, the remaining antennas of radar system 100 are unused and stay inactive. Also, in this configuration, a first TX antenna is formed by in-package antennas 110(1) and 110(3) together with external antenna 120(2), and a second TX antenna is formed by in-package antennas 110(2) and 110(4) together with external antenna 120(3). This flexible combination of in-package antenna(s) and external antenna(s) results in TX antennas having high gain.

Figure 6:
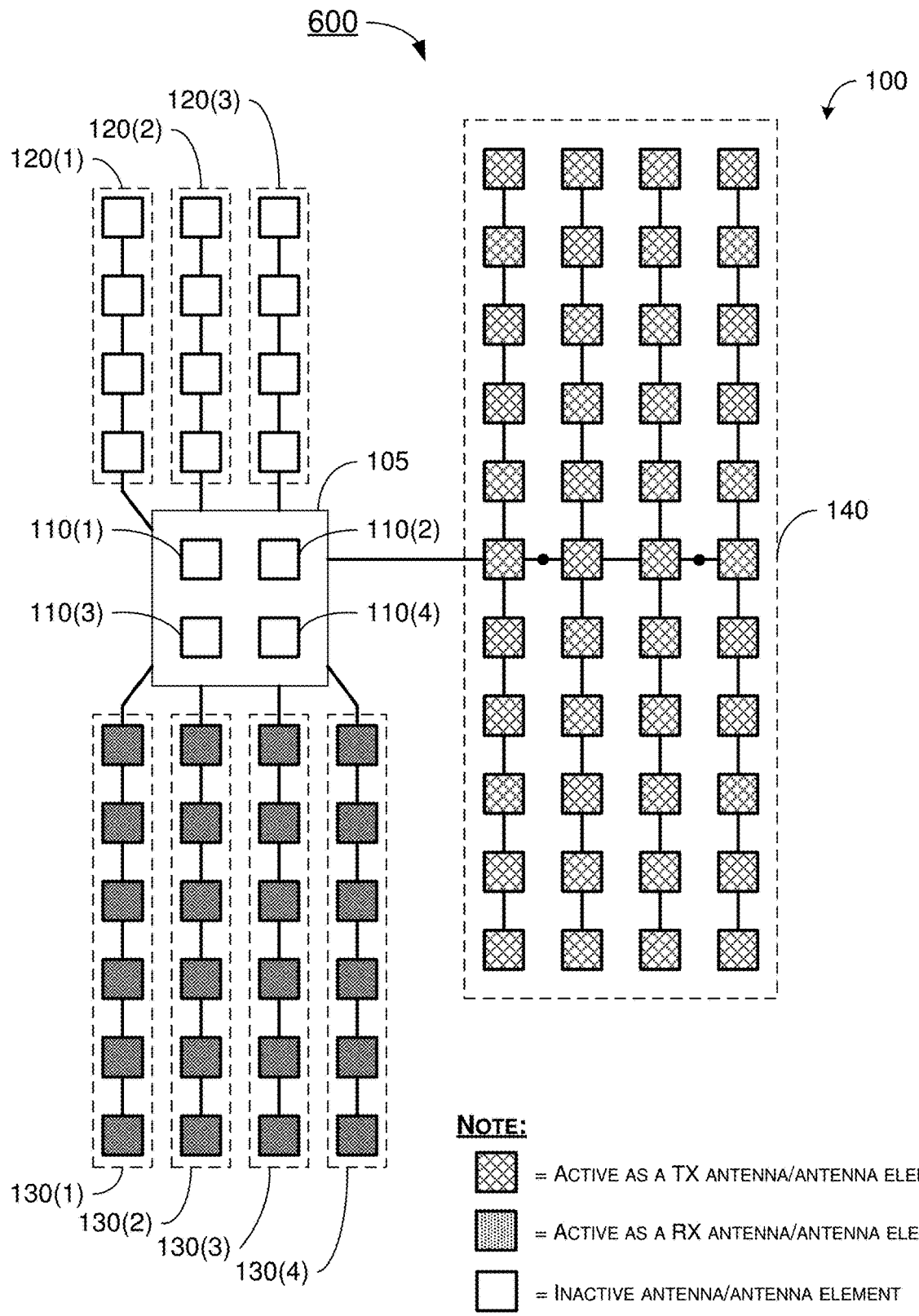
FIG. 6 is a diagram of another example configuration of the radar system of FIG. 1 in accordance with an implementation of the present disclosure.

FIG. 6 illustrates an example configuration 600 of radar system 100 in accordance with an implementation of the present disclosure. In the example shown in FIG. 6, antennas 110(1)-110(4), 120(1)-120(3), 130(1)-130(4) and 140 are utilized in a fifth configuration for radar system 100 to be in a fifth mode of radar operation as an LRR class of radar. For instance, one TX antenna and four RX antennas are utilized and active in this configuration. Specifically, as shown in FIG. 6, external antenna 140 is utilized as a TX antenna that is electrically coupled to a corresponding transmitter (not shown) to transmit radar signals. In this example, external antennas 130(1)-130(4) are utilized as RX antennas that are electrically coupled to corresponding receivers (not shown) to receive reflected radar signals. In this configuration, the remaining antennas of radar system 100 are unused and stay inactive.

In view of the examples shown in FIG. 2-FIG. 6, implementations in accordance with the present disclosure may flexibly perform radar class switching from one class of radar to another. This may be achieved by (1) activating respective transmitter(s) and receiver(s) corresponding to each class of radar and (2) utilizing a respective configuration of antennas corresponding to each class of radar. The antennas utilized may be solely in-package antennas, solely externa antennas, or a combination of one or more in-package antennas and one or more external antennas.

Figure 7A:
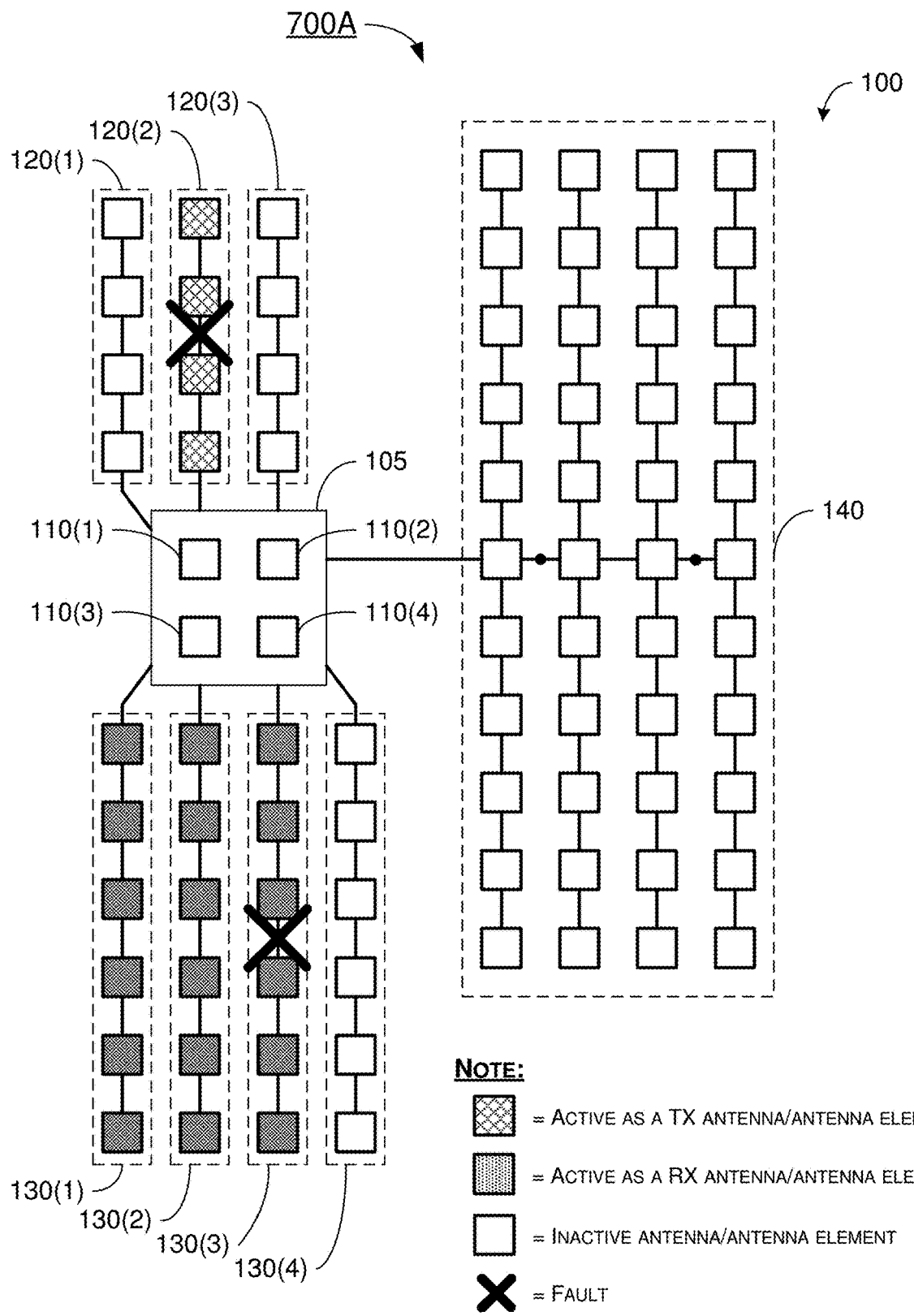
FIG. 7A and FIG. 7B illustrate an example scenario of reconfiguration of the radar system of FIG. 1 in accordance with an implementation of the present disclosure.
Figure 7B:
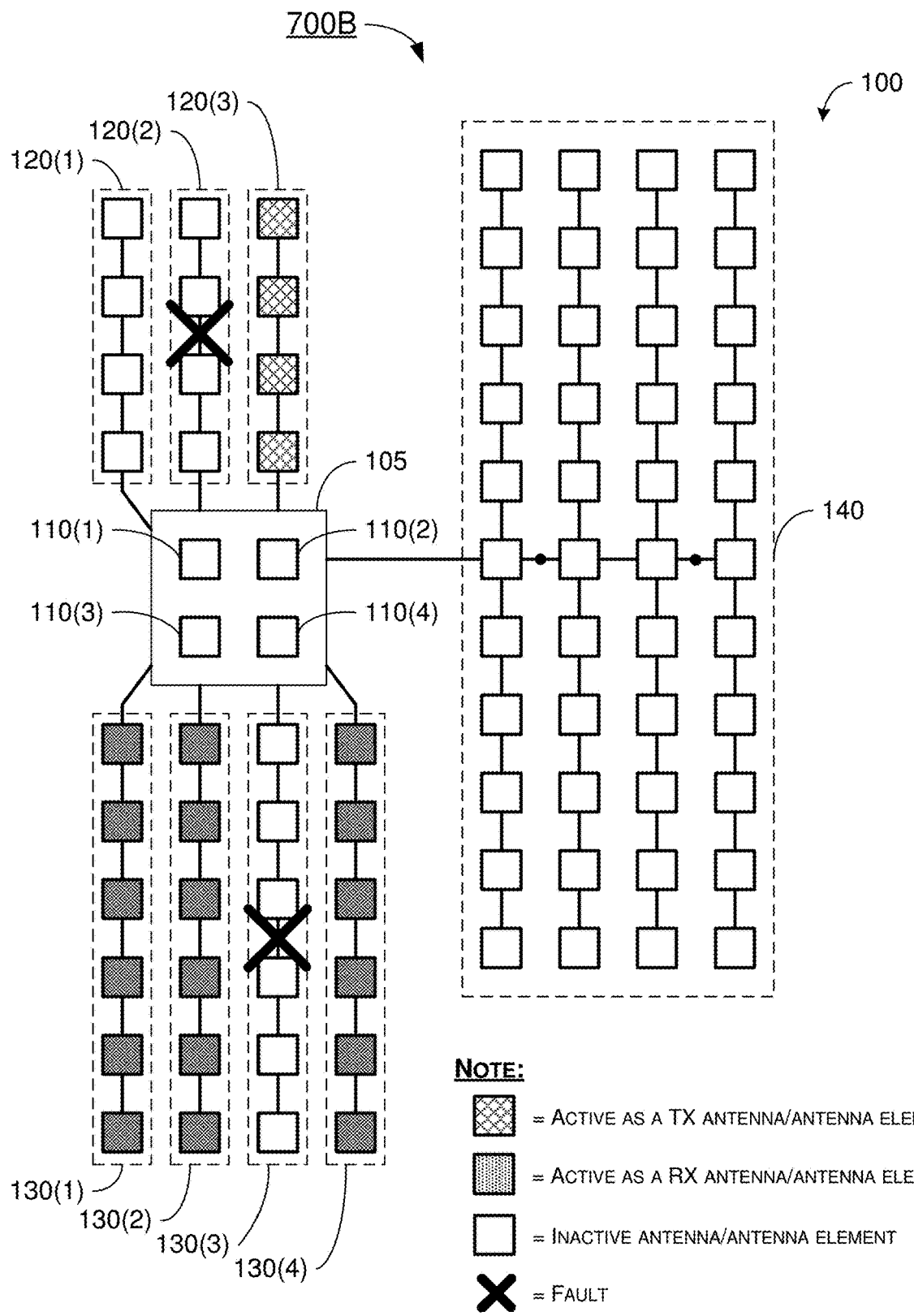

FIG. 7A and FIG. 7B illustrate an example scenario 700 of reconfiguration of radar system 100 in accordance with an implementation of the present disclosure. In the example shown in FIG. 7A, antennas 110(1)-110(4), 120(1)-120(3), 130(1)-130(4) and 140 may be initially utilized in a particular configuration for radar system 100 to be in a particular mode of radar operation having one TX antenna and three RX antennas utilized and active in this configuration. Specifically, as shown in scenario 700A in FIG. 7A, external antenna 120(2) is utilized as a TX antenna to transmit radar signals, and external antennas 130(1)-130(3) are utilized as RX antennas to receive reflected radar signals. In this example, the TX path and one of the RX paths fail during operation. That is, there is a fault in each of antenna 120(2) and antenna 130(3).

Under a proposed scheme of the present disclosure, a different antenna may be utilized to replace each of the failed TX antenna and the failed RX antenna. As shown in scenario 700B in FIG. 7B, antenna 120(3) is activated to replace antenna 120(2), which has failed. Similarly, antenna 130(4) is activated to replace antenna 130(3), which also has failed. As antenna 120(3) may be similar or identical to antenna 120(2) in terms of form factor, antenna characteristics for transmission of radar signals (e.g., gain and FOV) may remain relatively unchanged. Likewise, as antenna 130(4) may be similar or identical to antenna 130(3) in terms of form factor, antenna characteristics for receiving of reflected radar signals (e.g., gain and FOV) may remain relatively unchanged.

Figure 8A:
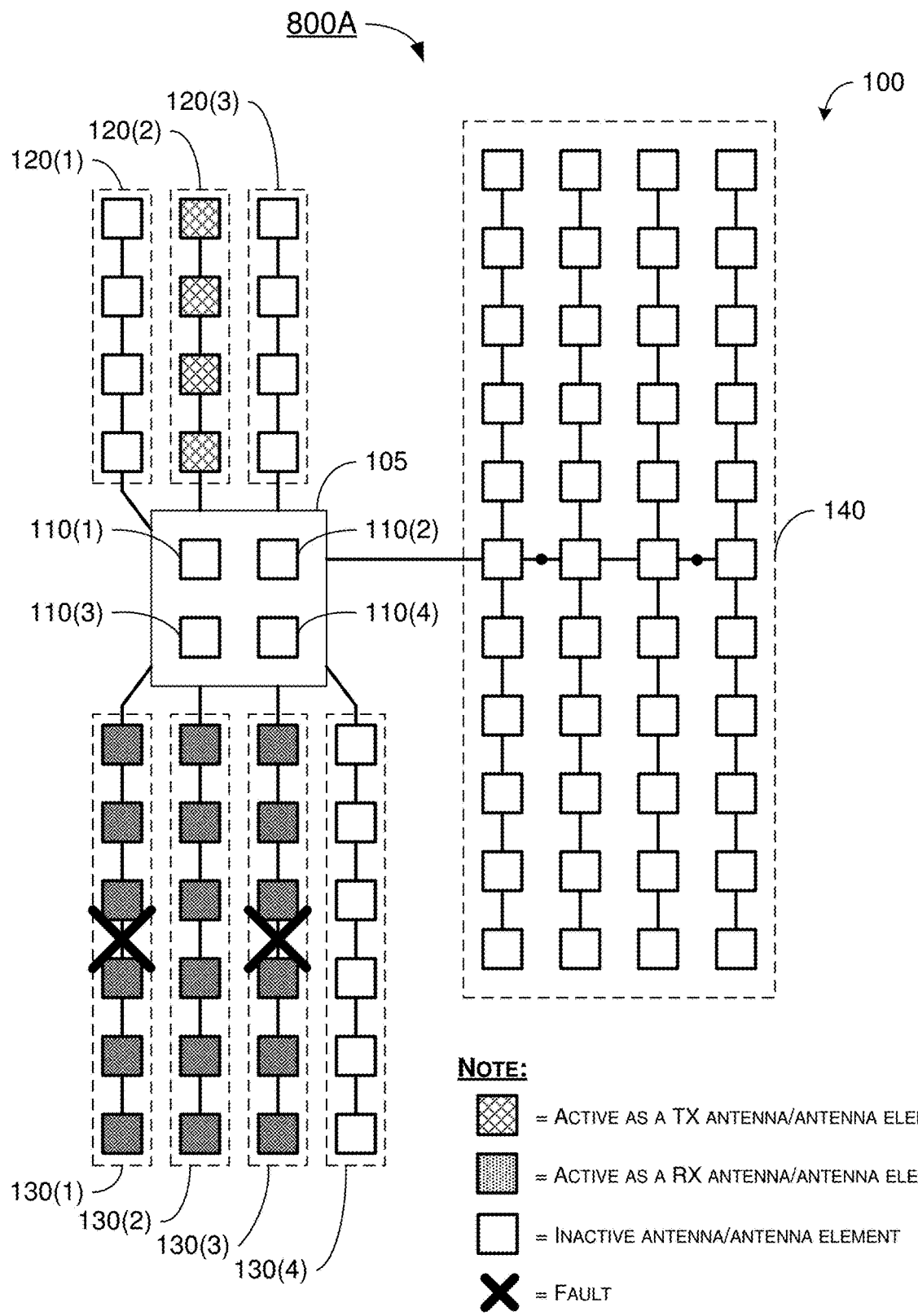
FIG. 8A and FIG. 8B illustrate another example scenario of reconfiguration of the radar system of FIG. 1 in accordance with an implementation of the present disclosure.
Figure 8B:
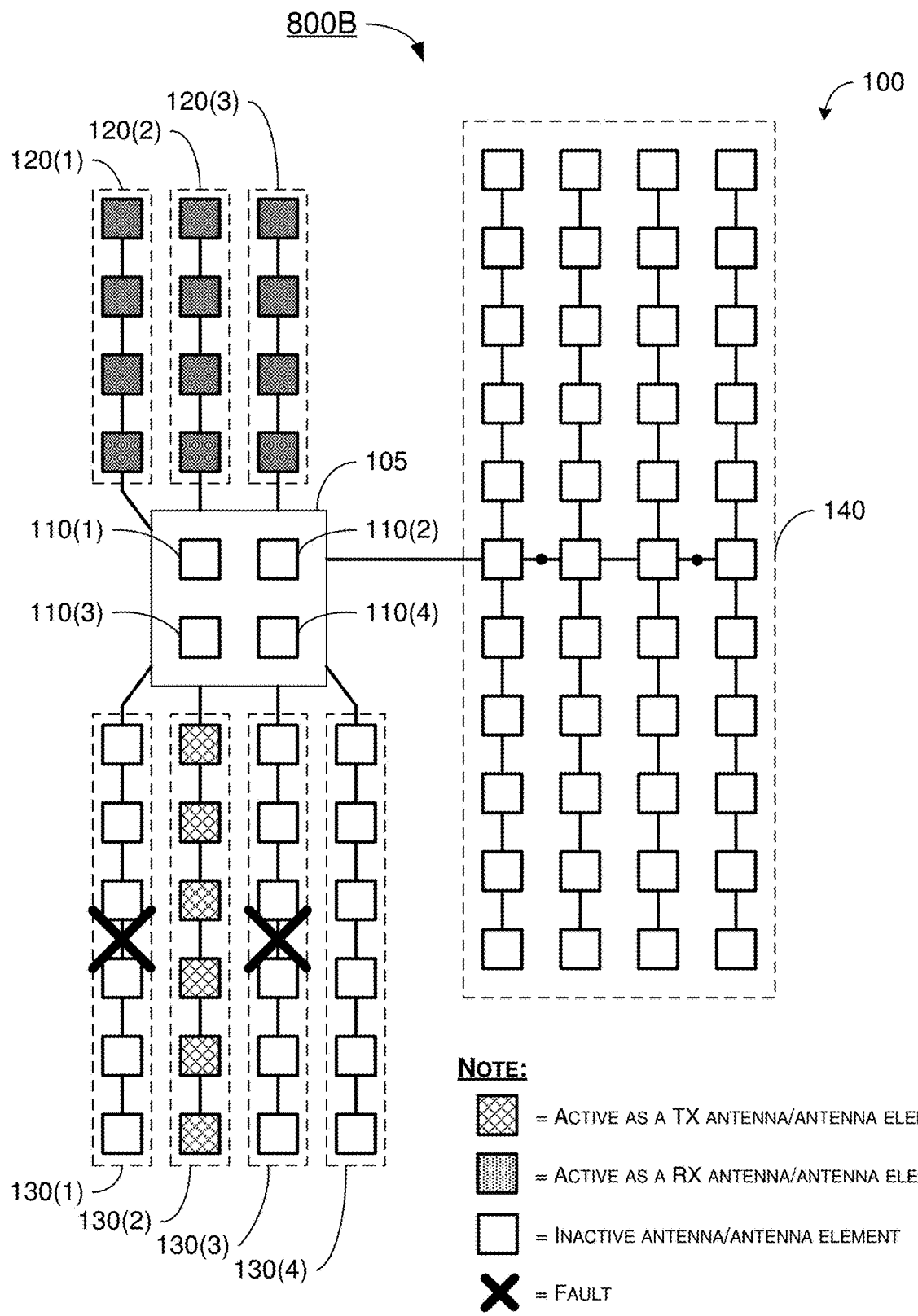

FIG. 8A and FIG. 8B illustrate an example scenario 800 of reconfiguration of radar system 100 in accordance with an implementation of the present disclosure. In the example shown in FIG. 8A, antennas 110(1)-110(4), 120(1)-120(3), 130(1)-130(4) and 140 may be initially utilized in a particular configuration for radar system 100 to be in a particular mode of radar operation having one TX antenna and three RX antennas utilized and active in this configuration. Specifically, as shown in scenario 800A in FIG. 8A, external antenna 120(2) is utilized as a TX antenna to transmit radar signals, and external antennas 130(1)-130(3) are utilized as RX antennas to receive reflected radar signals. In this example, two of the RX paths fail during operation. That is, there is a fault in each of antenna 130(1) and antenna 130(3).

Under a proposed scheme of the present disclosure, the TX path(s) and RX path(s) may be swapped to other functional (non-faulty) path(s) in that a different antenna may be utilized to replace each of the failed TX antenna and the failed RX antenna. As shown in scenario 800B in FIG. 8B, antennas 120(1)-120(3) are activated to replace antennas 130(1)-130(3) as the TX paths. Similarly, antenna 130(2) is activated to replace antenna 120(2) as part of the swap.

Illustrative Implementations

Figure 9A:
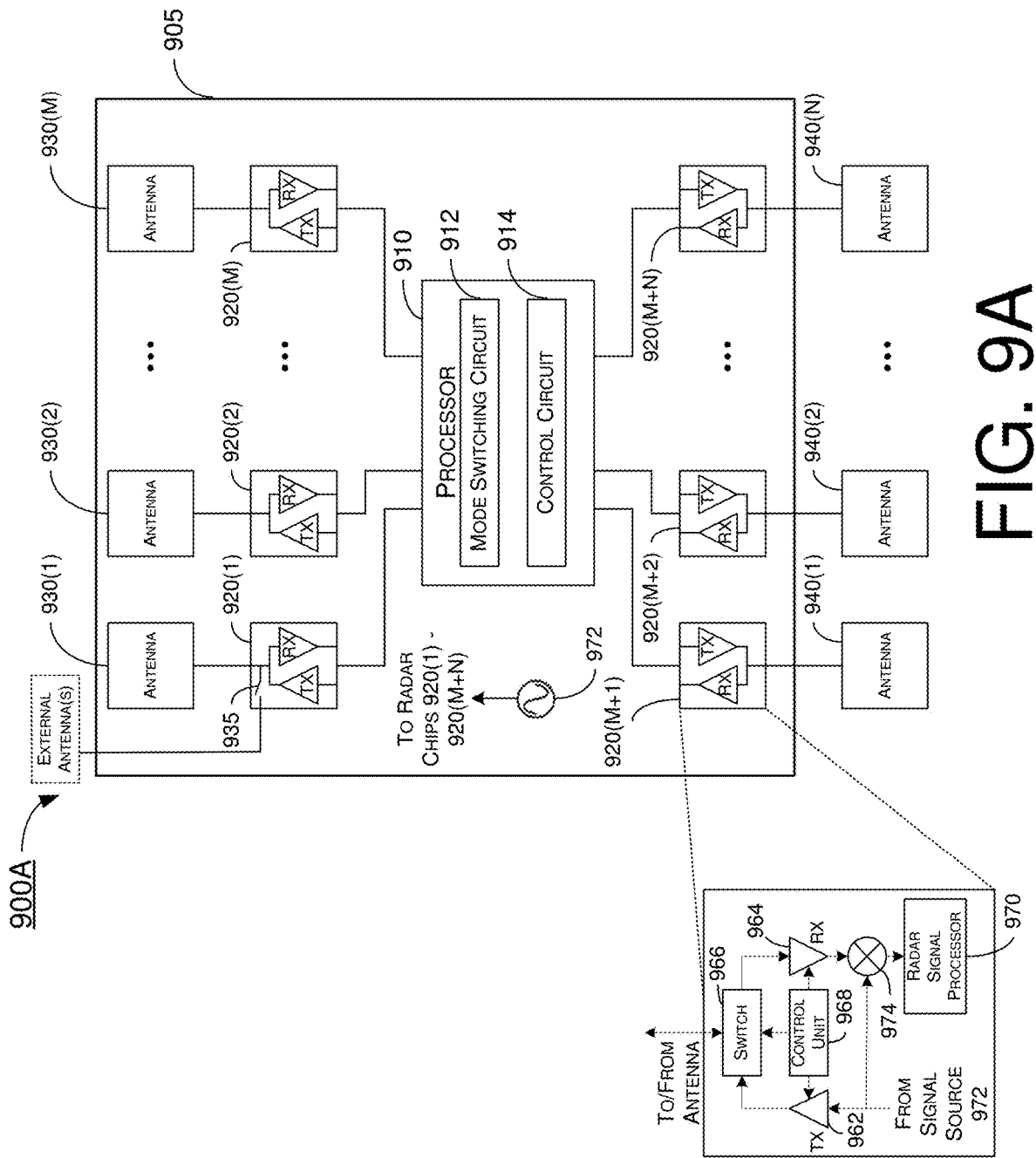
FIG. 9A is a block diagram of an example apparatus in accordance with an implementation of the present disclosure.

FIG. 9A illustrates an example apparatus 900A in accordance with an implementation of the present disclosure. Apparatus 900A may be an example implementation of radar system 100. Apparatus 900A may perform various functions, operations and/or tasks to implement concepts, schemes, techniques, processes and methods described herein pertaining to reconfigurable RF front end and antenna arrays for radar mode switching in accordance with the present disclosure, including those described with respect to some or all of FIG. 1-FIG. 8A/8B as well as processes 1200 and 1300 described below.

Apparatus 900A may be a part of an electronic apparatus or a transportation vehicle such as an automobile. For instance, apparatus 900A may be implemented in an autonomous vehicle. Alternatively, apparatus 900A may be implemented, at least partly, in the form of one or more integrated-circuit (IC) chips such as, for example and not limited to, one or more single-core processors, one or more multi-core processors, or one or more complex-instruction-set-computing (CISC) processors.

Apparatus 900A may include at least some of those components shown in FIG. 9A. For instance, apparatus 900A may include at least a processor 910. Additionally, apparatus 900A may include one or more radar chips such as radar chips 920(1)-920(M+N), where each of M and N is a positive integer. It is also noteworthy that, although illustrated as multiple separate and individual radar chips, in some implementations some or all of radar chips 920(1)-920(M+N) may be implemented in a single radar chip (and in such case they are transceiver circuits or transceiver elements, instead of individual radar chips). Radar chips/transceiver circuits 920(1)-920(M+N) may be controlled/configured by processor 910 to transmit or receive with different signal phases to form and steer RF beams. Apparatus 900A may also include one or more in-package antennas such as antennas 930(1)-930(M). Each of antennas 930(1)-930(M) may correspond to and may be electrically coupled to a respective one of radar chips 920(1)-920(M+N), such as one of radar chips 920(1)-920(M). In the example shown in FIG. 9A, processor 910, radar chips 920(1)-920(M+N) and antennas 930(1)-930(M) are enclosed or otherwise packaged in a single package 905. In some implementations, apparatus 900A may further include one or more external antennas such as antennas 940(1)-940(N). Each of antennas 940(1)-940(N) may correspond to and may be electrically coupled to a respective one of radar chips 920(1)-920(M+N), such as one of radar chips 920(M+1)-920(M+N). Antennas 940(1)-940(N) are external to package 905 and may be disposed together or separately on one or more objects such as, for example, a printed circuit board (PCB). In some implementations, between a radar chip/transceiver circuit and its in-package antenna (e.g., between 920(1) and 930(1)), there may be an additional switch 935 to couple the in-package antenna (e.g., 930(1)) to outside of package 905 to form connection(s) with external antenna(s) such as the example shown in FIG. 5. That is, the in-package antennas 930(1)-930(M) (which may be on-chip antennas) and external antennas 940(1)-940(N) (which may be off-chip antennas) may be coupled to the same transceiver/radar chip in addition to the already described condition with multiple transceivers/radar chips. In such case, the on-chip antennas and off-chip antennas may be placed or otherwise designed together to properly form an antenna array.

Each of radar chips 920(1)-920(M+N) may respectively include a TX 962, a RX 964, a duplexer or switch 966 and a control unit 968. Switch 966 may be electrically coupled between TX 962 and RX 964, and may be controlled by control unit 968 to electrically connect either TX 962 or RX 964 to a respective antenna at any given time. That is, either TX 962 or RX 964, but not both, may be electrically connected to the respective antenna through switch 966 unless switch 966 was replaced with a circulator. Control unit 968 may activate (turn on) or deactivate (turn off) TX 962 and RX 964 alternatively while controlling switch 966 to switch between TX 962 and RX 964. Switch 966 may be an implicit switch embedded in TX 962 and RX 964 as enable/disable circuitries. As such, the respective radar chip may function as a transmitter when TX 962 is turned on and electrically connected to the respective antenna through switch 966 with RX 964 turned off. Similarly, the respective radar chip may function as a receiver when RX 964 is turned on and electrically connected to the respective antenna through switch 966 with TX 962 turned off. Each of radar chips 920(1)-920(M+N) may also include a mixer 974 and/or a radar signal processor 970. Apparatus 900A may include a signal source 972 that generates and provides a radar signal for transmission via TX 962 of each of radar chips 920(1)-920(M+N). Radar signal processor 970 may receive a signal, representative of the reflected radar signal, from RX 964 via mixer 974 to process the signal. Alternatively, either or both of mixer 974 and radar signal processor 970 may be external to the radar chip.

In one aspect, processor 910 may be implemented in the form of one or more single-core processors, one or more multi-core processors, or one or more CISC processors. That is, even though a singular term "a processor" is used herein to refer to processor 910, processor 910 may include multiple processors in some implementations and a single processor in other implementations in accordance with the present disclosure. In another aspect, processor 910 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 910 is a special-purpose machine specifically designed, arranged and configured to perform specific tasks including reconfigurable RF front end and antenna arrays for radar mode switching in accordance with various implementations of the present disclosure.

Processor 910, as a special-purpose machine, may include non-generic and specially-designed hardware circuits that are designed, arranged and configured to perform specific tasks pertaining to reconfigurable RF front end and antenna arrays for radar mode switching in accordance with various implementations of the present disclosure. In some implementations, processor 910 may include a mode switching circuit 912 and a control circuit 914 that, together, perform specific tasks and functions to render reconfigurable RF front end and antenna arrays for radar mode switching in accordance with various implementations of the present disclosure.

In operation, at any given time, antennas 930(1)-930(M) and antennas 940(1)-940(N) may be operable in one of a plurality of configurations for a respective one of a plurality of modes of radar operations. Processor 910 may be operably coupled to radar chips 920(1)-920(M+N) to control radar chips 920(1)-920(M+N) to perform the radar operations. For instance, processor 910 may control radar chips 920(1)-920(M+N) to operate, by utilizing respective antenna(s) of antennas 930(1)-930(M) and antennas 940(1)-940(N), in one of the following modes at any given time: an ultra-short-range radar (USRR) mode, a short-range radar (SRR) mode, a medium-range radar (MRR) mode and a long-range radar (LRR) mode.

In operation, mode switching circuit 912 of processor 910 may select one of the plurality of modes of radar operations. Control circuit 914 of processor 910 may control radar chips 920(1)-920(M+N) to operate in the selected mode by utilizing antennas 930(1)-930(M) and antennas 940(1)-940(N) in a respective configuration of the plurality of configurations which corresponds to the selected mode. In some implementations, each configuration of the plurality of configurations of the antennas may result in respective antenna characteristics. Additionally, each configuration of the plurality of configurations of the antennas may utilize a respective number of antennas of the plurality of antennas.

For instance, for the USRR mode, a configuration of one TX and one RX, a configuration of one TX and two RX's, or a configuration of one TX and three RX's may be utilized. For the SRR mode and MRR mode, a configuration of one TX and three RX's or a configuration of two TX's and four RX's may be utilized. For the LRR mode, a configuration of one TX and four or more RX's may be utilized. That is, regardless of the mode or class of radar, select ones of antennas 930(1)-930(M) and antennas 940(1)-940(N) may be utilized as TX antenna(s) or RX antenna(s).

In some implementations, in controlling radar chips 920(1)-920(M+N) to operate in the selected mode by utilizing antennas 930(1)-930(M) and antennas 940(1)-940(N) in the respective configuration of the plurality of configurations which corresponds to the selected mode, control circuit 914 may perform a number of operations. For instance, control circuit 914 may utilize a first subset of one or more antennas of antennas 930(1)-930(M) and antennas 940(1)-940(N) to transmit radar signals. Control circuit 914 may also utilize a second subset of one or more antennas of antennas 930(1)-930(M) and antennas 940(1)-940(N) to receive reflected radar signals. Control circuit 914 may detect a fault in the first subset or the second subset. As a result of the detecting, control circuit 914 may perform either of the following: (1) utilizing a third subset of one or more antennas of antennas 930(1)-930(M) and antennas 940(1)-940(N) to transmit the radar signals responsive to the fault being associated with at least one antenna in the first subset; or (2) utilizing a fourth subset of one or more antennas of antennas 930(1)-930(M) and antennas 940(1)-940(N) to receive the reflected radar signals responsive to the fault being associated with at least one antenna in the second subset.

In some implementations, the utilizing of the first subset may result in first antenna characteristics for transmitting the radar signals, the utilizing of the second subset may result in second antenna characteristics for receiving the reflected radar signals, the utilizing of the third subset may result in third antenna characteristics for transmitting the radar signals, and the utilizing of the fourth subset may result in fourth antenna characteristics for receiving the reflected radar signals. The third antenna characteristics may approximate (e.g., substantially equal to) the first antenna characteristics. The fourth antenna characteristics may approximate (e.g., substantially equal to) the second antenna characteristics.

In some implementations, a first antenna of antennas 930(1)-930(M) and antennas 940(1)-940(N) may be in both the second subset and the third subset. Moreover, a second antenna of antennas 930(1)-930(M) and antennas 940(1)-940(N) may be in both the first subset and the fourth subset. An example scenario is illustrated in FIG. 8A and FIG. 8B.

In some implementations, the respective antenna characteristics of each configuration of the plurality of configurations of the antennas may include respective values in terms of at least an antenna gain and a field of view.

In some implementations, in controlling radar chips 920(1)-920(M+N) to operate in the selected mode by utilizing antennas 930(1)-930(M) and antennas 940(1)-940(N) in the respective configuration of the plurality of configurations of the antennas which corresponds to the selected mode, control circuit 914 may perform a number of operations for each mode of the plurality of modes. For instance, for each mode, control circuit 914 may activate a respective first number of transmitters (or radar chips) to transmit radar signals through a first subset of one or more antennas of antennas 930(1)-930(M) and antennas 940(1)-940(N) having the respective first number of antennas. Additionally, for each mode, control circuit 914 may activate a respective second number of receivers (or radar chips) to receive reflected radar signals through a second subset of one or more antennas of antennas 930(1)-930(M) and antennas 940(1)-940(N) having the respective second number of antennas. In some implementations, the respective first number for a first mode of the modes may differ from the respective first number for at least a second mode of the modes. Moreover, the respective second number for the first mode of the modes may differ from the respective second number for at least a third mode of the modes.

In some implementations, control circuit 914 may control radar chips 920(1)-920(M+N) to operate in a first mode of a plurality of modes by utilizing antennas 930(1)-930(M) and antennas 940(1)-940(N) in a first configuration of a plurality of configurations. Mode switching circuit 912 may determine a need to switch radar chips 920(1)-920(M+N) from operating in the first mode to a second mode of the plurality of modes. As a result, control circuit 914 may control radar chips 920(1)-920(M+N) to operate in the second mode by utilizing antennas 930(1)-930(M) and antennas 940(1)-940(N) in a second configuration of the plurality of configurations. Each configuration of the plurality of configurations of the antennas may result in respective antenna characteristics such that first antenna characteristics of the first configuration differ from second antenna characteristics of the second configuration. In some implementations, the first antenna characteristics of the first configuration may differ from the second antenna characteristics of the second configuration in terms of an antenna gain, a field of view, or both.

In some implementations, in controlling radar chips 920(1)-920(M+N) to operate in the first mode of the plurality of modes by utilizing antennas 930(1)-930(M) and antennas 940(1)-940(N) in the first configuration of the plurality of configurations of the antennas, control circuit 914 may activate a first number of transmitters (or radar chips) to transmit radar signals through a first subset of one or more antennas of antennas 930(1)-930(M) and antennas 940(1)-940(N) having the first number of antennas. Additionally, control circuit 914 may activate a second number of receivers (or radar chips) to receive reflected radar signals through a second subset of one or more antennas of antennas 930(1)-930(M) and antennas 940(1)-940(N) having the second number of antennas.

Alternatively or additionally, in controlling radar chips 920(1)-920(M+N) to operate in the second mode by utilizing antennas 930(1)-930(M) and antennas 940(1)-940(N) in the second configuration of the plurality of configurations of the antennas, control circuit 914 may activate a third number of transmitters (or radar chips) to transmit the radar signals through a third subset of one or more antennas of antennas 930(1)-930(M) and antennas 940(1)-940(N) having the third number of antennas. Furthermore, control circuit 914 may activate a fourth number of receivers (or radar chips) to receive the reflected radar signals through a fourth subset of one or more antennas of antennas 930(1)-930(M) and antennas 940(1)-940(N) having the fourth number of antennas.

In some implementations, control circuit 914 may detect a fault in at least one of antennas 930(1)-930(M) and antennas 940(1)-940(N) in the second configuration utilized for radar operations. Consequently, control circuit 914 may control radar chips 920(1)-920(M+N) to operate in the second mode by utilizing antennas 930(1)-930(M) and antennas 940(1)-940(N) in a third configuration of the plurality of configurations of the antennas. In some implementations, third antenna characteristics of the third configuration may approximate (e.g., substantially equal to) the second antenna characteristics of the second configuration. For instance, the gain and FOV of the third configuration may be similar or identical to the gain and FOV of the second configuration, even though different antennas may be utilized in the second configuration and the third configuration.

Figure 9B:
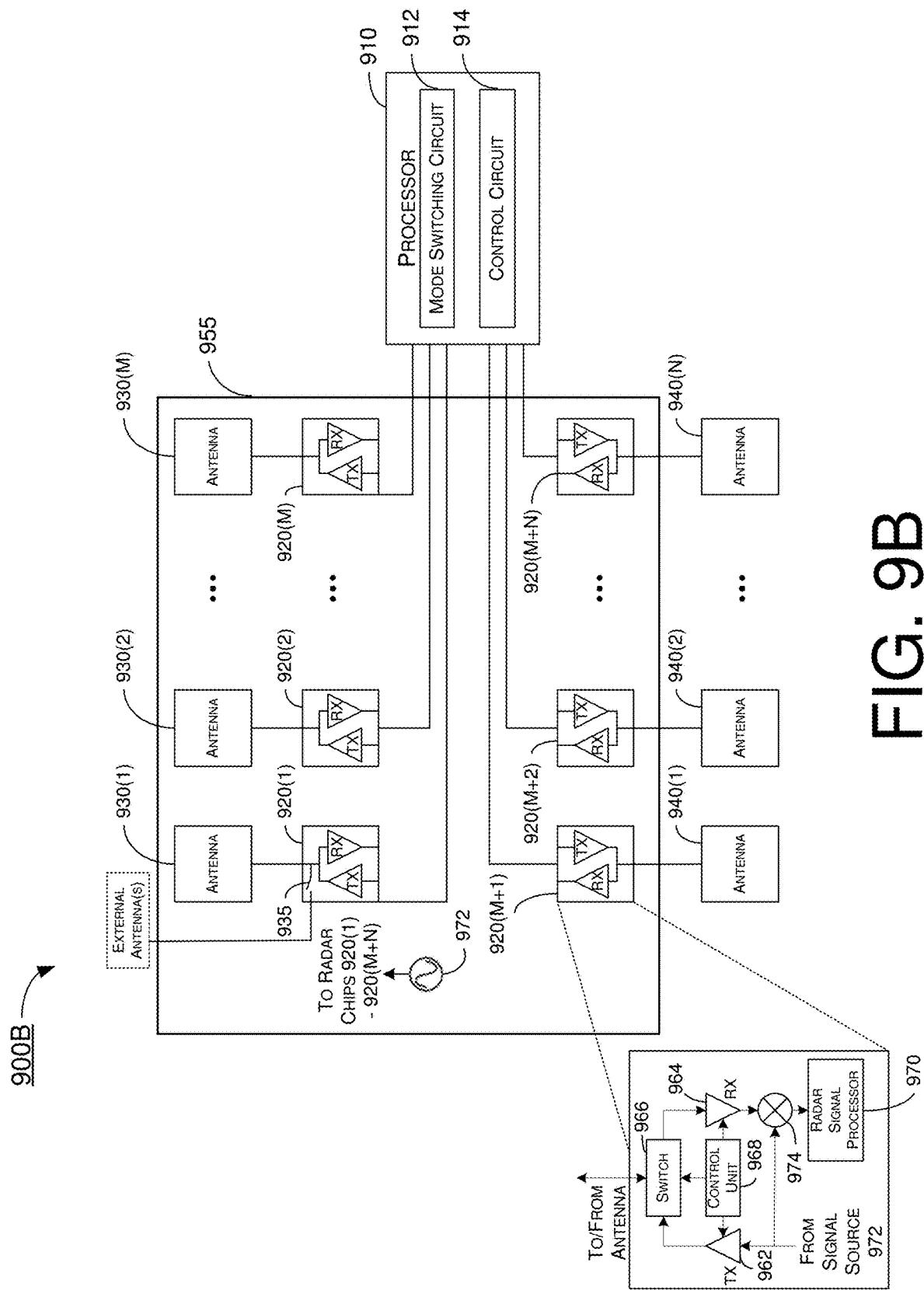
FIG. 9B is a block diagram of another example apparatus in accordance with an implementation of the present disclosure.

FIG. 9B illustrates an example apparatus 900B in accordance with an implementation of the present disclosure. Apparatus 900B may be an example implementation of radar system 100. Apparatus 900B may perform various functions, operations and/or tasks to implement concepts, schemes, techniques, processes and methods described herein pertaining to reconfigurable RF front end and antenna arrays for radar mode switching in accordance with the present disclosure, including those described with respect to some or all of FIG. 1-FIG. 8A/8B as well as processes 1200 and 1300 described below.

Apparatus 900B may be a part of an electronic apparatus or a transportation vehicle such as an automobile. For instance, apparatus 900B may be implemented in an autonomous vehicle. Alternatively, apparatus 900B may be implemented, at least partly, in the form of one or more IC chips such as, for example and not limited to, one or more single-core processors, one or more multi-core processors, or one or more CISC processors.

Apparatus 900B may include at least some of those components shown in FIG. 9B. For instance, apparatus 900B may include at least a processor 910. Additionally, apparatus 900B may include one or more radar chips such as radar chips 920(1)-920(M+N), where each of M and N is a positive integer. Apparatus 900B may also include one or more in-package antennas such as antennas 930(1)-930(M). Each of antennas 930(1)-930(M) may correspond to and may be electrically coupled to a respective one of radar chips 920(1)-920(M+N), such as one of radar chips 920(1)-920(M). In the example shown in FIG. 9B, radar chips 920(1)-920(M+N) and antennas 930(1)-930(M) are enclosed or otherwise packaged in a single package 955, while processor 910 is external to package 955. In some implementations, apparatus 900B may further include one or more external antennas such as antennas 940(1)-940(N). Each of antennas 940(1)-940(N) may correspond to and may be electrically coupled to a respective one of radar chips 920(1)-920(M+N), such as one of radar chips 920(M+1)-920(M+N). Antennas 940(1)-940(N) are external to package 955 and may be disposed together or separately on one or more objects such as, for example, a PCB.

Apparatus 900B differs from apparatus 900A in that processor 910 in apparatus 900B is external to package 955 while processor 910 in apparatus 900A is enclosed in package 905. Otherwise, description of the structure, functions, features and operations of apparatus 900A provided above also applies to apparatus 900B. Thus, in the interest of brevity and simplicity, detailed description of the structure and function of apparatus 900B is not provided to avoid redundancy.

Figure 10:
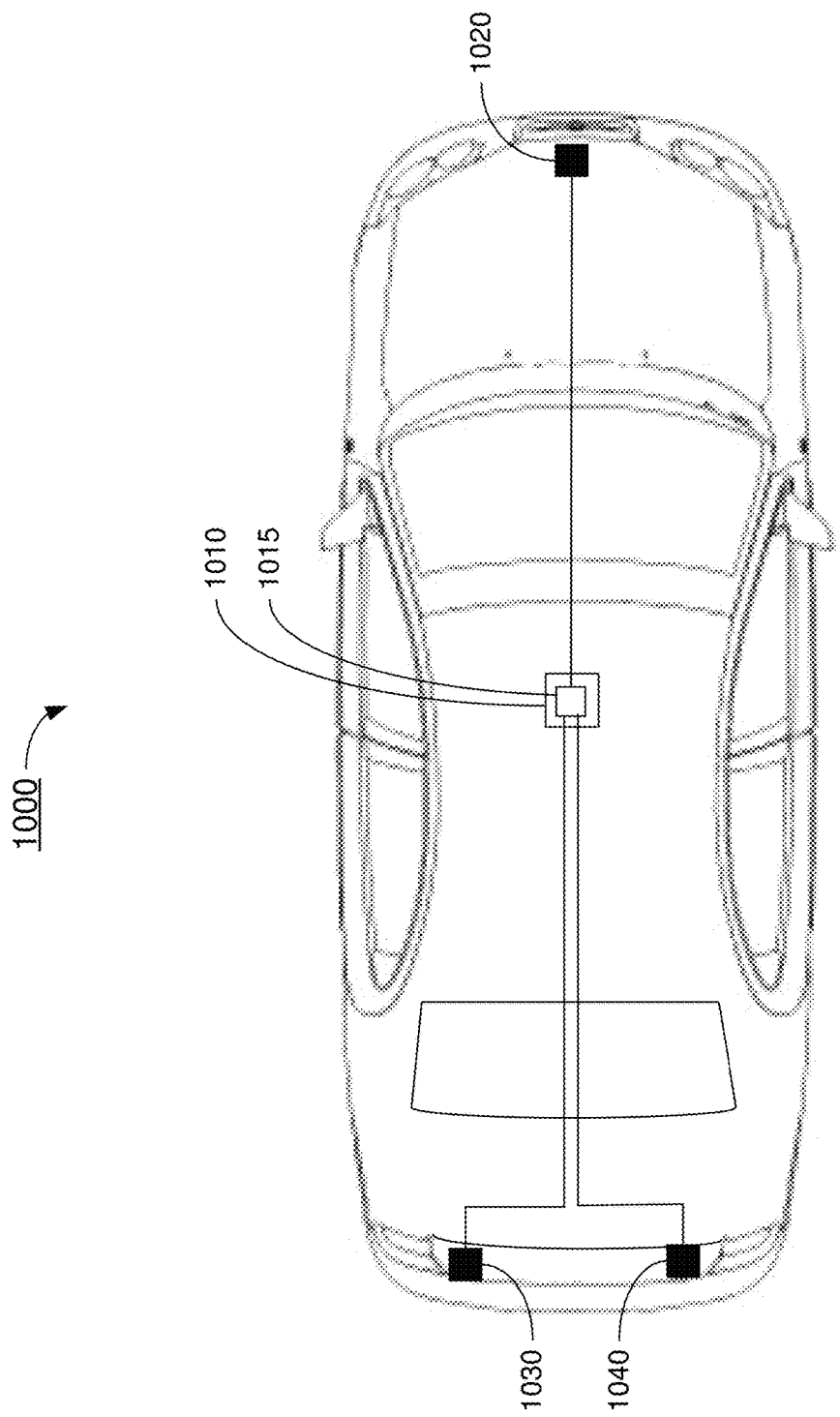
FIG. 10 is a diagram of an example automobile in accordance with an implementation of the present disclosure.

FIG. 10 illustrates an example automobile 1000 in accordance with an implementation of the present disclosure. Automobile 1000 may be a manually-operated vehicle operated by a human driver. Alternatively, automobile 1000 may be a vehicle that can be operated in a manual mode and an autonomous mode. Still alternatively, automobile 1000 may be an autonomous vehicle that is fully automatic and does not require any manual operation.

As shown in FIG. 10, automobile 1000 may be equipped with a control system 1010 having a processor 1015 that controls one or more radar systems such as radar systems 1020, 1030 and 1040. Processor 1015 and radar systems 1020, 1030 and 1040 may be an example implementation of radar system 100 and/or apparatus 900B, whether completely or partially. Thus, in the interest of brevity and simplicity, detailed description of the structure and function of each of processor 1015 and radar systems 1020, 1030 and 1040 is not provided to avoid redundancy.

Processor 1015, together with radar systems 1020, 1030 and 1040, may implement reconfigurable RF front end and antenna arrays for radar mode switching in accordance with the present disclosure. Thus, under the control of processor 1015, each of radar systems 1020, 1030 and 1040 may operate in a plurality of modes to function as a multi-class radar to provide various horizontal field of views and elevational field of views.

Figure 11:
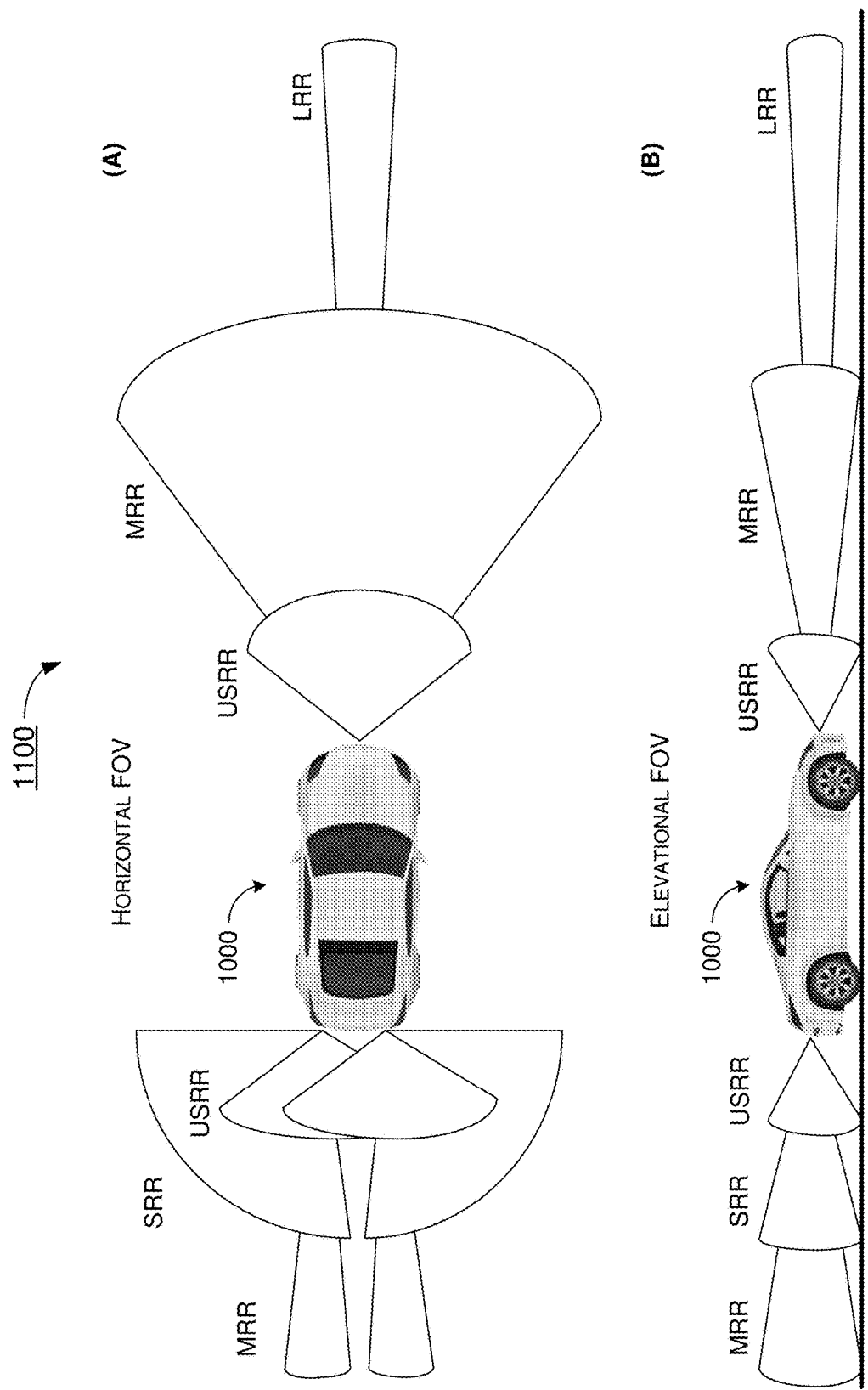
FIG. 11 illustrates various automotive radar field of views of an example automobile in accordance with an implementation of the present disclosure.

FIG. 11 illustrates a demonstration 1100 various automotive radar field of views of automobile 1000 in accordance with an implementation of the present disclosure. As shown in FIG. 11, each of the multiple radar systems 1020, 1030 and 1040 installed on automobile 1000 may operate in a plurality of modes to function as a multi-class radar to provide various horizontal field of views and elevational field of views. That is, each radar system on automobile 1000 may function as some or all of the following: an ultra-short-range radar (USRR), a short-range radar (SRR), a medium-range radar (MRR) and a long-range radar (LRR). In the example shown in FIG. 11, the front radar system (e.g., radar system 1020) may function as a multi-class radar as an USRR, an MRR and an LRR. Similarly, each of the two rear radar systems (e.g., radar systems 1030 and 1040) may function as a multi-class radar as an USRR, an SRR and an MRR.

Figure 12:
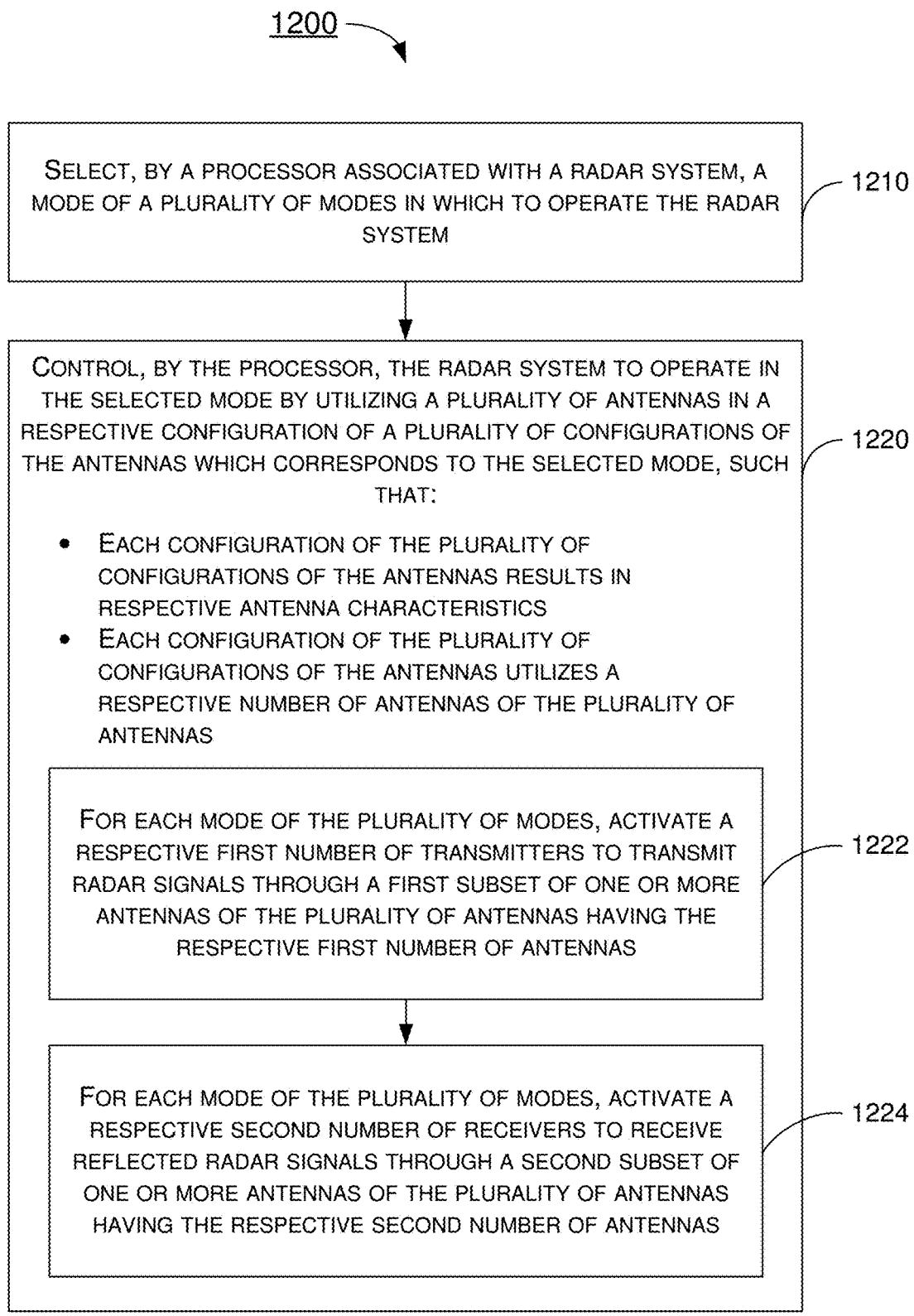
FIG. 12 is a flowchart of an example process in accordance with an implementation of the present disclosure.

FIG. 12 illustrates an example process 1200 in accordance with an implementation of the present disclosure. Process 1200 may represent an aspect of implementing the proposed concepts and schemes such as those described with respect to some or all of FIG. 1-FIG. 11. More specifically, process 1200 may represent an aspect of the proposed concepts and schemes pertaining to reconfigurable RF front end and antenna arrays for radar mode switching. Process 1200 may include one or more operations, actions, or functions as illustrated by one or more of blocks 1210 and 1220 as well as sub-blocks 1222 and 1224. Although illustrated as discrete blocks, various blocks of process 1200 may be divided into additional blocks, combined into fewer blocks, or eliminated, depending on the desired implementation. Moreover, the blocks/sub-blocks of process 1200 may be executed in the order shown in FIG. 12 or, alternatively in a different order. The blocks/sub-blocks of process 1200 may be executed iteratively. Process 1200 may be implemented by or in apparatus 900A, apparatus 900B and automobile 1000 as well as any variations thereof. For instance, process 1200 may be implemented by or in apparatus 900A and/or apparatus 900B. Solely for illustrative purposes and without limiting the scope, process 1200 is described below in the context of apparatus 900A/900B implemented as radar system 100 in automobile 1000. Process 1200 may begin at block 1210.

At 1210, process 1200 may involve processor 910 selecting a mode of a plurality of modes in which to operate radar system 100. Process 1200 may proceed from 1210 to 1220.

At 1220, process 1200 may involve processor 910 controlling radar system 100 to operate in the selected mode by utilizing a plurality of antennas (e.g., antennas 110(1)-110(4), 120(1)-120(3), 130(1)-130(4) and 140) in a respective configuration of a plurality of configurations of the antennas which corresponds to the selected mode. Each configuration of the plurality of configurations of the antennas may result in respective antenna characteristics. Each configuration of the plurality of configurations of the antennas may utilize a respective number of antennas of the plurality of antennas.

In some implementations, the controlling of radar system 100 to operate in the selected mode by utilizing the plurality of antennas in the respective configuration of the plurality of configurations of the antennas which corresponds to the selected mode may involve a number of operations such as those shown in sub-blocks 1222 and 1224.

At 1222, process 1200 may involve processor 910 activating, for each mode of the plurality of modes, a respective first number of transmitters to transmit radar signals through a first subset of one or more antennas of the plurality of antennas having the respective first number of antennas. Process 1200 may proceed from 1222 to 1224.

At 1224, process 1200 may involve processor 910 activating, for each mode of the plurality of modes, a respective second number of receivers to receive reflected radar signals through a second subset of one or more antennas of the plurality of antennas having the respective second number of antennas.

In some implementations, the respective first number for a first mode of the modes may differ from the respective first number for at least a second mode of the modes. Moreover, the respective second number for the first mode of the modes may differ from the respective second number for at least a third mode of the modes.

In some implementations, the first subset of one or more antennas of the plurality of antennas may include one or more in-package antennas, one or more external antennas, or a combination thereof. Additionally, the one or more in-package antennas may be enclosed in a package with the first number of transmitters, while the one or more external antennas may be external to the package.

Alternatively or additionally, the second subset of one or more antennas of the plurality of antennas may include one or more in-package antennas, one or more external antennas, or a combination thereof. Moreover, the one or more in-package antennas may be enclosed in a package with the second number of receives, while the one or more external antennas may be external to the package.

In some implementations, the plurality of modes may include the following: an USRR mode, a SRR mode, an MRR mode and an LRR mode.

In some implementations, the respective antenna characteristics of each configuration of the plurality of configurations of the antennas may include respective values in terms of at least an antenna gain and a field of view.

In some implementations, regarding the controlling of radar system 100 to operate in the selected mode by utilizing the plurality of antennas in the respective configuration of the plurality of configurations of the antennas which corresponds to the selected mode, process 1200 may involve processor 910 performing a number of operations. For instance, process 1200 may involve processor 910 utilizing a first subset of one or more antennas of the plurality of antennas to transmit radar signals. Additionally, process 1200 may involve processor 910 utilizing a second subset of one or more antennas of the plurality of antennas to receive reflected radar signals. Moreover, process 1200 may involve processor 910 detecting a fault in the first subset or the second subset. Furthermore, process 1200 may involve processor 910 performing either of the following: (1) utilizing a third subset of one or more antennas of the plurality of antennas to transmit the radar signals responsive to the fault being associated with at least one antenna in the first subset, and (2) utilizing a fourth subset of one or more antennas of the plurality of antennas to receive the reflected radar signals responsive to the fault being associated with at least one antenna in the second subset.

In some implementations, the utilizing of the first subset may result in first antenna characteristics for transmitting the radar signals, the utilizing of the second subset may result in second antenna characteristics for receiving the reflected radar signals, the utilizing of the third subset may result in third antenna characteristics for transmitting the radar signals, the utilizing of the fourth subset may result in fourth antenna characteristics for receiving the reflected radar signals, the third antenna characteristics may approximate (e.g., substantially equal to) the first antenna characteristics, and the fourth antenna characteristics may approximate (e.g., substantially equal to) the second antenna characteristics.

In some implementations, a first antenna of the plurality of antennas may be in both the second subset and the third subset. Additionally, a second antenna of the plurality of antennas may be in both the first subset and the fourth subset.

Figure 13:
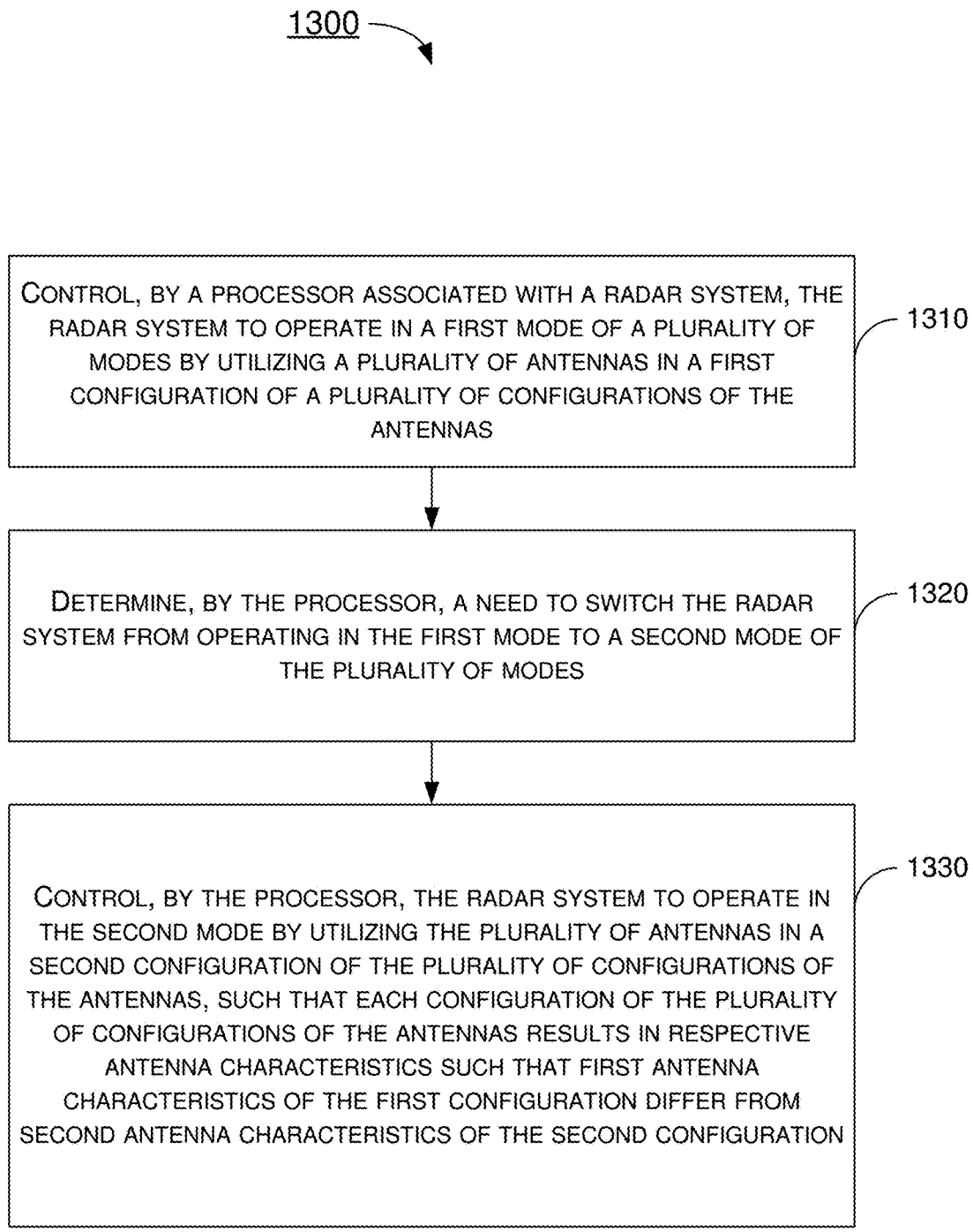
FIG. 13 is a flowchart of another example process in accordance with an implementation of the present disclosure.

FIG. 13 illustrates an example process 1300 in accordance with an implementation of the present disclosure. Process 1300 may represent an aspect of implementing the proposed concepts and schemes such as those described with respect to some or all of FIG. 1-FIG. 11. More specifically, process 1300 may represent an aspect of the proposed concepts and schemes pertaining to reconfigurable RF front end and antenna arrays for radar mode switching. Process 1300 may include one or more operations, actions, or functions as illustrated by one or more of blocks 1310, 1320 and 1330. Although illustrated as discrete blocks, various blocks of process 1300 may be divided into additional blocks, combined into fewer blocks, or eliminated, depending on the desired implementation. Moreover, the blocks/sub-blocks of process 1300 may be executed in the order shown in FIG. 13 or, alternatively in a different order. The blocks/sub-blocks of process 1300 may be executed iteratively. Process 1300 may be implemented by or in apparatus 900A, apparatus 900B and automobile 1000 as well as any variations thereof. For instance, process 1300 may be implemented by or in apparatus 900A and/or apparatus 900B. Solely for illustrative purposes and without limiting the scope, process 1300 is described below in the context of apparatus 900A/900B implemented as radar system 100 in automobile 1000. Process 1300 may begin at block 1310.

At 1310, process 1300 may involve processor 910 controlling radar system 100 to operate in a first mode of a plurality of modes by utilizing a plurality of antennas (e.g., antennas 110(1)-110(4), 120(1)-120(3), 130(1)-130(4) and 140) in a first configuration of a plurality of configurations of the antennas. Process 1300 may proceed from 1310 to 1320.

At 1320, process 1300 may involve processor 910 determining a need to switch radar system 100 from operating in the first mode to a second mode of the plurality of modes. Process 1300 may proceed from 1320 to 1330.

At 1330, process 1300 may involve processor 910 controlling radar system 100 to operate in the second mode by utilizing the plurality of antennas in a second configuration of the plurality of configurations of the antennas. Each configuration of the plurality of configurations of the antennas may result in respective antenna characteristics such that first antenna characteristics of the first configuration differ from second antenna characteristics of the second configuration.

In some implementations, the first antenna characteristics of the first configuration may differ from the second antenna characteristics of the second configuration in terms of an antenna gain, a field of view, or both.

In some implementations, regarding the controlling of radar system 100 to operate in the first mode of the plurality of modes by utilizing the plurality of antennas in the first configuration of the plurality of configurations of the antennas, process 1300 may involve processor 910 performing a number of operations. For instance, process 1300 may involve processor 910 activating a first number of transmitters to transmit radar signals through a first subset of one or more antennas of the plurality of antennas having the first number of antennas. Additionally, process 1300 may involve processor 910 activating a second number of receivers to receive reflected radar signals through a second subset of one or more antennas of the plurality of antennas having the second number of antennas. Likewise, regarding the controlling of radar system 100 to operate in the second mode by utilizing the plurality of antennas in the second configuration of the plurality of configurations of the antennas, process 1300 may involve processor 910 performing a number of operations. For instance, process 1300 may involve processor 910 activating a third number of transmitters to transmit the radar signals through a third subset of one or more antennas of the plurality of antennas having the third number of antennas. Moreover, process 1300 may involve processor 910 activating a fourth number of receivers to receive the reflected radar signals through a fourth subset of one or more antennas of the plurality of antennas having the fourth number of antennas.

In some implementations, process 1300 may involve processor 910 performing additional operations. For instance, process 1300 may involve processor 910 detecting a fault in at least one of the antennas in the second configuration utilized for radar operations. Furthermore, process 1300 may involve processor 910 controlling radar system 100 to operate in the second mode by utilizing the plurality of antennas in a third configuration of the plurality of configurations of the antennas. In such cases, third antenna characteristics of the third configuration may approximate (e.g., substantially equal to) the second antenna characteristics of the second configuration.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   selecting, by a processor associated with a radar system, a mode of a plurality of modes in which to operate the radar system; and
   controlling, by the processor, the radar system to operate in the selected mode by utilizing a plurality of antennas in a respective configuration of a plurality of configurations of the antennas which corresponds to the selected mode,
   wherein each configuration of the plurality of configurations of the antennas results in respective antenna characteristics,
   wherein each configuration of the plurality of configurations of the antennas utilizes a respective number of antennas of the plurality of antennas,
   wherein at least two antennas of the plurality of antennas have one or more characteristics that are different among a plurality of characteristics comprising gain and power consumption,
   wherein the controlling of the radar system to operate in the selected mode by utilizing the plurality of antennas in the respective configuration of the plurality of configurations of the antennas which corresponds to the selected mode comprises:
      utilizing at least one first antenna of a first subset of two or more antennas of the plurality of antennas to transmit radar signals;
      utilizing at least one second antenna of a second subset of two or more antennas of the plurality of antennas to receive reflected radar signals;
      detecting a fault in at least one third antenna in the first subset or the second subset; and
      utilizing a third subset of one or more antennas of the plurality of antennas to transmit the radar signals and utilizing a fourth subset of one or more antennas of the plurality of antennas to receive the reflected radar signals,
   wherein the third subset of one or more antennas comprise one or more functional second antennas from the second subset of two or more antennas,
   wherein the fourth subset of one or more antennas comprise one or more functional first antenna from the first subset of two or more antennas, and
   wherein the at least one third antenna is not in the third subset of one or more antennas and not in the fourth subset of one or more antennas.

2. The method of claim 1, wherein the selecting of the mode of the plurality of modes comprises selecting a mode from a plurality of modes comprising:
   an ultra-short-range radar (USRR) mode;
   a short-range radar (SRR) mode;
   a medium-range radar (MRR) mode; and
   a long-range radar (LRR) mode.

3. The method of claim 1, wherein the controlling of the radar system to operate in the selected mode by utilizing the plurality of antennas in the respective configuration of the plurality of configurations of the antennas which corresponds to the selected mode comprises:
   for each mode of the plurality of modes:
      activating a respective first number of transmitters to transmit radar signals through the first subset of two or more antennas of the plurality of antennas having the respective first number of antennas; and
      activating a respective second number of receivers to receive reflected radar signals through the second subset of two or more antennas of the plurality of antennas having the respective second number of antennas.

4. The method of claim 3, wherein the respective first number for a first mode of the modes differs from the respective first number for at least a second mode of the modes, and wherein the respective second number for the first mode of the modes differs from the respective second number for at least a third mode of the modes.

5. The method of claim 1, wherein the controlling of the radar system to operate in the selected mode by utilizing the plurality of antennas in the respective configuration of the plurality of configurations of the antennas which corresponds to the selected mode further comprises:
   utilizing a fourth subset of one or more antennas of the plurality of antennas to receive the reflected radar signals responsive to the fault being associated with at least one antenna in the second subset.

6. The method of claim 5, wherein the utilizing of the first subset results in first antenna characteristics for transmitting the radar signals, wherein the utilizing of the second subset results in second antenna characteristics for receiving the reflected radar signals, wherein the utilizing of the third subset results in third antenna characteristics for transmitting the radar signals, wherein the utilizing of the fourth subset results in fourth antenna characteristics for receiving the reflected radar signals, wherein the third antenna characteristics approximate the first antenna characteristics, and wherein the fourth antenna characteristics approximate the second antenna characteristics.

7. The method of claim 5, wherein a first antenna of the plurality of antennas is in both the second subset and the third subset, and wherein a second antenna of the plurality of antennas is in both the first subset and the fourth subset.

8. A method, comprising:
   selecting, by a processor associated with a radar system, a mode of a plurality of modes in which to operate the radar system; and
   controlling, by the processor, a plurality of radar chips of the radar system to operate in the selected mode by utilizing a plurality of antennas corresponding to the plurality of radar chips in a respective configuration of a plurality of configurations of the antennas which corresponds to the selected mode,
   wherein each configuration of the plurality of configurations of the antennas results in respective antenna characteristics,
   wherein each configuration of the plurality of configurations of the antennas utilizes a respective number of antennas of the plurality of antennas,
   wherein each of the plurality of radar chips comprises a transmitter, a receiver, a switch and a control unit with the switch coupled between the transmitter and the receiver and with the control unit controlling the switch to electrically connect either the transmitter or the receiver to a respective one of the plurality of antennas through the switch,
   wherein the utilizing of the plurality of antennas comprises:
      utilizing at least one first antenna of a first subset of two or more antennas of the plurality of antennas to transmit radar signals;
      utilizing at least one second antenna of a second subset of two or more antennas of the plurality of antennas to receive reflected radar signals;
      detecting a fault in at least one third antenna in the first subset or the second subset; and
      utilizing a third subset of one or more antennas of the plurality of antennas to transmit the radar signals and utilizing a fourth subset of one or more antennas of the plurality of antennas to receive the reflected radar signals,
   wherein the third subset of one or more antennas comprise one or more functional second antennas from the second subset of two or more antennas,
   wherein the fourth subset of one or more antennas comprise one or more functional first antenna from the first subset of two or more antennas, and
   wherein the at least one third antenna is not in the third subset of one or more antennas and not in the fourth subset of one or more antennas.

* * * * *